(12) United States Patent
Yoshikawa et al.

(10) Patent No.: US 10,205,872 B2
(45) Date of Patent: Feb. 12, 2019

(54) DISPLAY CONTROL APPARATUS AND METHOD FOR CONTROLLING THE SAME

(71) Applicant: CANON KABUSHIKI KAISHA, Tokyo (JP)

(72) Inventors: Akio Yoshikawa, Yokohama (JP); Satoshi Ishimaru, Kawasaki (JP); Koichi Nakagawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 64 days.

(21) Appl. No.: 15/346,511

(22) Filed: Nov. 8, 2016

(65) Prior Publication Data

US 2017/0134642 A1 May 11, 2017

(30) Foreign Application Priority Data

Nov. 10, 2015 (JP) ................. 2015-220703
Nov. 10, 2015 (JP) ................. 2015-220756
Nov. 10, 2015 (JP) ................. 2015-220757

(51) Int. Cl.
*H04N 5/232* (2006.01)
*H04N 5/235* (2006.01)
*H04N 5/202* (2006.01)
*H04N 9/04* (2006.01)
*G06F 3/0481* (2013.01)
(Continued)

(52) U.S. Cl.
CPC ......... *H04N 5/23216* (2013.01); *H04N 5/202* (2013.01); *H04N 5/2351* (2013.01); *H04N 5/2352* (2013.01); *H04N 5/2353* (2013.01); *H04N 5/23222* (2013.01); *H04N 5/23245* (2013.01); *H04N 5/23293* (2013.01); *H04N 9/045* (2013.01); *G06F 3/0482* (2013.01); *G06F 3/04817* (2013.01); *G06F 3/04886* (2013.01); *G09G 2320/0613* (2013.01); *G09G 2320/0673* (2013.01)

(58) Field of Classification Search
CPC .............. H04N 5/202; H04N 5/23216; H04N 5/23293; G09G 2320/0613; G09G 2320/062; G09G 2320/0673
See application file for complete search history.

(56) References Cited

U.S. PATENT DOCUMENTS

2015/0002700 A1* 1/2015 Oshima ............. G02F 1/133603
348/231.99
2015/0009246 A1* 1/2015 Watanabe ............ G09G 3/2092
345/690
(Continued)

FOREIGN PATENT DOCUMENTS

JP 2002223373 A 8/2002

*Primary Examiner* — Daniel M Pasiewicz
(74) *Attorney, Agent, or Firm* — Canon U.S.A., Inc. IP Division

(57) ABSTRACT

An apparatus includes a display control unit configured to display a first type of image captured with a first gradation characteristic and a second type of image captured with a second gradation characteristic having a higher gradation quality on a high-luminance side than the first gradation characteristic, and a control unit configured to perform control such that luminance of a display unit is set to second luminance higher than first luminance of a case where the first type of image is displayed, in a case where the second type of image is displayed.

32 Claims, 16 Drawing Sheets

(51) Int. Cl.
*G06F 3/0482* (2013.01)
*G06F 3/0488* (2013.01)

(56) References Cited

U.S. PATENT DOCUMENTS

2015/0055025 A1* 2/2015 Gotoh .................. G09G 3/3426
                                                     348/790
2017/0127034 A1* 5/2017 Urisaka ..................... H04N 9/69
2017/0318208 A1* 11/2017 Toyoda ................ H04N 5/2256

* cited by examiner

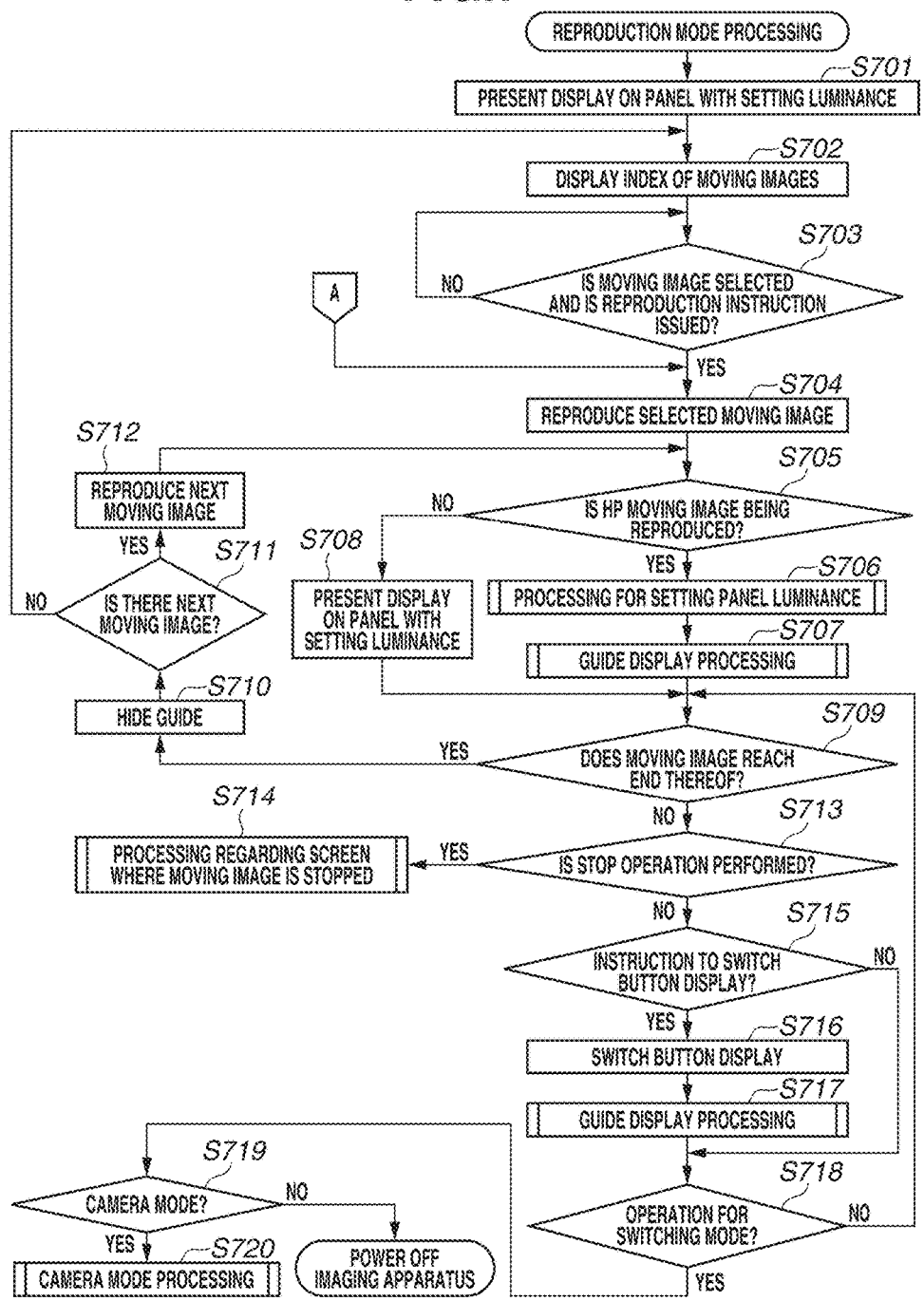

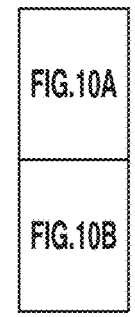
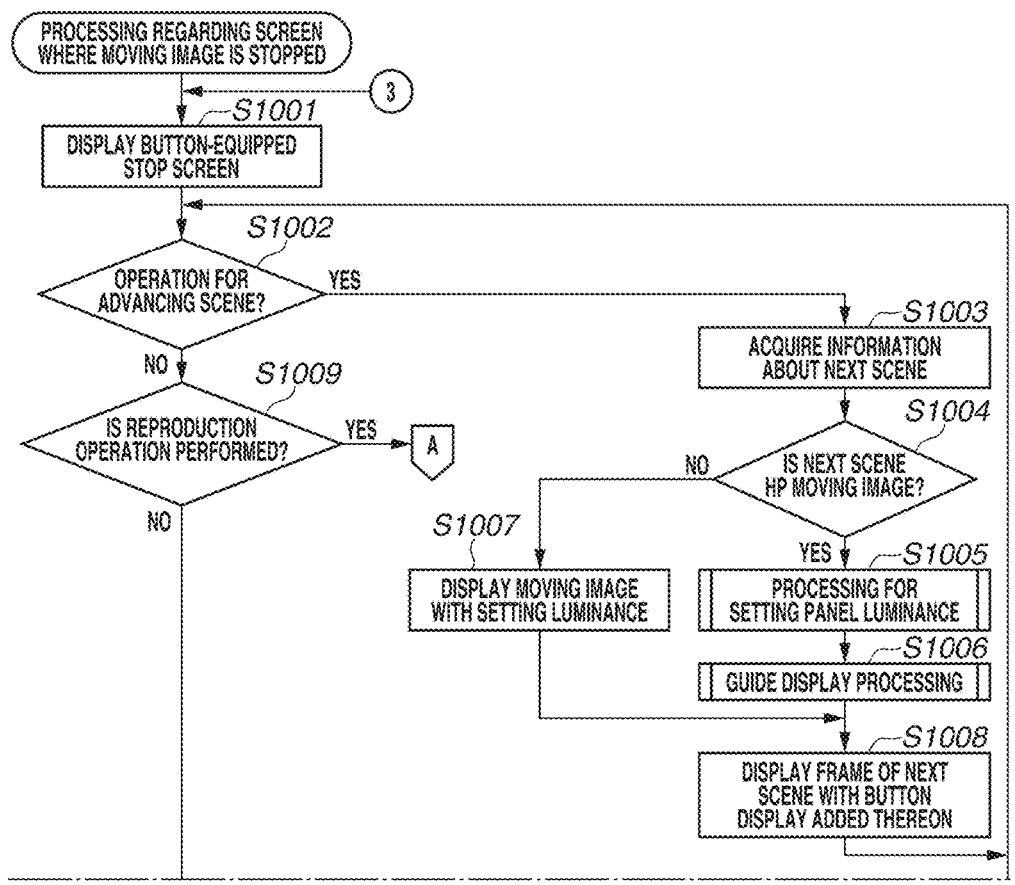

DISPLAY CONTROL APPARATUS AND METHOD FOR CONTROLLING THE SAME

BACKGROUND OF THE INVENTION

Field of the Invention

The aspect of the embodiments relates to a display control apparatus and a method for controlling the display control apparatus, and, in particular, to control of luminance of a display apparatus.

Description of the Related Art

Conventionally, there have been known video systems configured to image an object by an imaging apparatus and display this video image on a display apparatus to enable a user to view the video image. In such a kind of video system, when imaging the object, the imaging apparatus converts a tone of the object into a video signal by converting luminance of the object into a code value based on a gamma characteristic of the imaging apparatus. Then, when displaying the video image, the display apparatus converts the code value provided as the video signal into an output luminance value based on a gamma characteristic of the display apparatus. By the processing performed in this manner, the video system can cut out a range covering limited brightness from the real-world object that has an extremely wide dynamic range, and display the video image while making it fall within a limited narrow dynamic range of the display apparatus. Generally, a measure for extending an input dynamic range with use of knee correction processing is employed to secure a practical input dynamic range at the imaging apparatus when the object is imaged (Japanese Patent Application Laid-Open No. 2002-223373).

Generally, the imaging apparatus is configured to secure the practical input dynamic range by compressing a contrast in a region which is from intermediate luminance to high luminance. However, in such a case, a gradation characteristic as a system total, which is a total of the gamma characteristic of the imaging apparatus and the gamma characteristic of the display apparatus, ends up becoming an unnatural gradation characteristic in which the contrast is compressed at a high-luminance portion compared to a low-luminance portion. One possible solution to avoid such a disadvantage is that the gradation characteristic as the system total, which is the total of the gamma characteristic of the imaging apparatus and the gamma characteristic of the display apparatus, is linearized with respect to the luminance. Linearizing the gradation characteristic with respect to the luminance allows an entire region from a dark portion to a highlight portion to be expressed with a more natural gradation. However, when the video image having the gradation characteristic linearized with respect to the luminance is displayed on the display apparatus, the intermediate luminance and the low luminance are darkened although the natural gradation can be attained, compared to the generally used gradation characteristic that is not the gradation characteristic linearized with respect to the luminance.

Further, monitors built in reproduction apparatuses are configured to allow luminance thereof to be controlled according to the video image to be reproduced, but, regarding monitors connected to external video output terminals, such as High-Definition Multimedia Interface (HDMI) (registered trademark), the luminance cannot be controlled from the reproduction apparatus side on many of them. Therefore, there is such a situation that, when the video image captured so as to achieve the gradation characteristic linearized with respect to the luminance is output to such an external monitor and the video image is displayed with a normal luminance setting, the displayed video image is unintentionally darkened.

SUMMARY OF THE INVENTION

According to an aspect of the present invention, an apparatus includes a display control unit configured to display a first type of image captured with a first gradation characteristic, and a second type of image captured with a second gradation characteristic having a higher gradation quality on a high-luminance side than the first gradation characteristic, and a control unit configured to perform control such that luminance of a display unit is set to second luminance higher than first luminance of a case where the first type of image is displayed, in a case where the second type of image is displayed.

Further features of the aspect of the embodiments will become apparent from the following description of exemplary embodiments with reference to the attached drawings.

BRIEF DESCRIPTION OF THE DRAWINGS

FIG. 7 is a flowchart illustrating reproduction mode processing.

FIG. 10 is a flowchart illustrating processing regarding a screen where a moving image is stopped.

FIG. 12 is a flowchart illustrating editing processing.

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the aspect of the embodiments is in no way limited to the following exemplary embodiment.

<Hardware Configuration>

Figure 1:
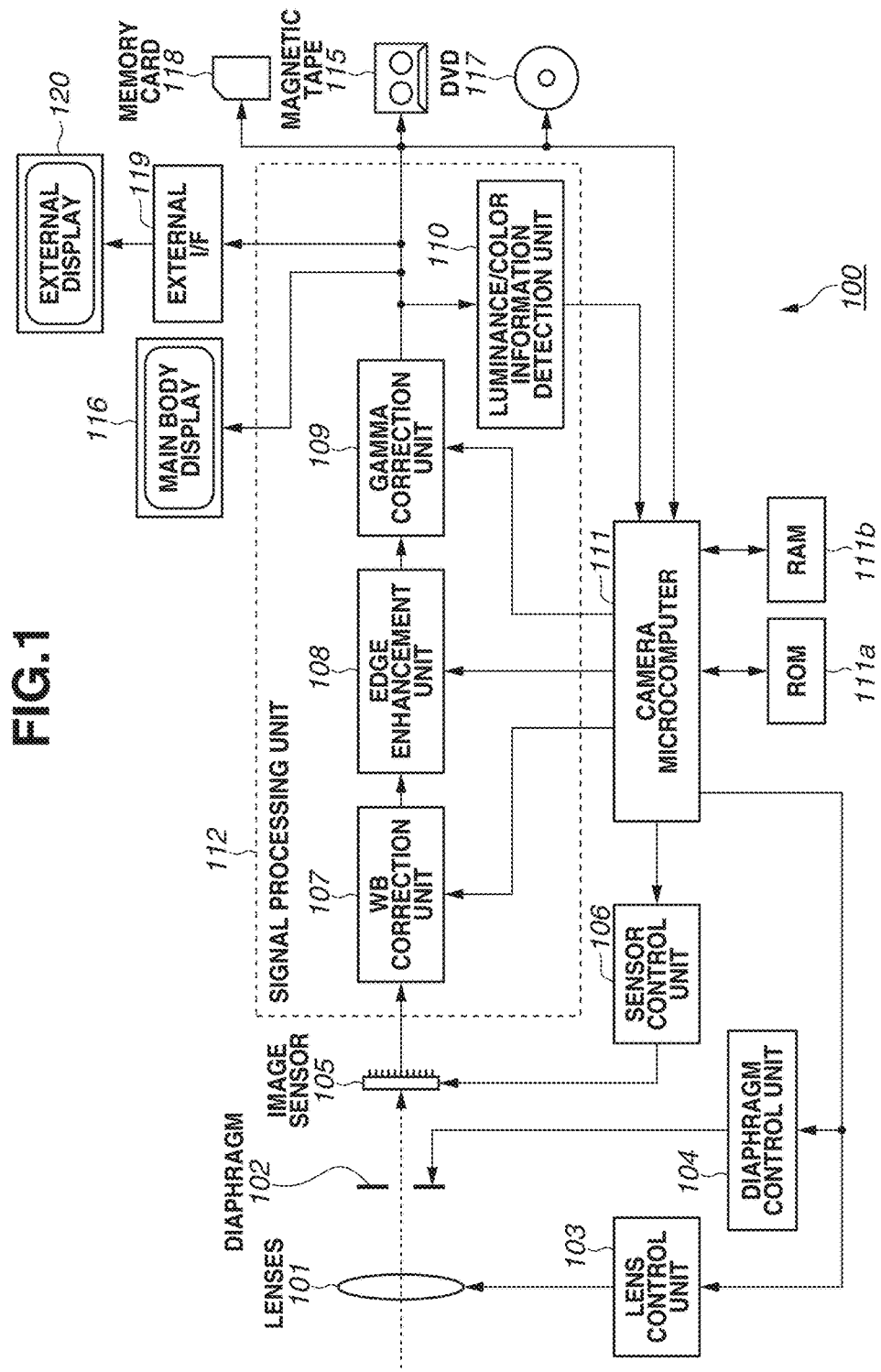
FIG. 1 is a schematic configuration diagram illustrating a configuration of an imaging apparatus.

FIG. 1 illustrates a schematic configuration diagram of a digital camera (hereinafter referred to as an imaging apparatus 100) as one example of a display control apparatus.

In FIG. 1, lenses 101 are a lens group including a plurality of lenses, such as a focus lens and a zoom lens, and a diaphragm 102 is disposed behind the lenses 101. Light introduced via the lenses 101 and the diaphragm 102 is imaged on an imaging plane of an image sensor 105 as an object image. The formed object image is converted from an optical signal into a video signal (video data) at the image sensor 105. The video signal acquired by the image sensor 105 is transmitted to a signal processing unit 112. The signal processing unit 112 performs white balance correction processing by a white balance (WB) correction unit 107, edge enhancement processing by an edge enhancement unit 108, and gamma correction processing by a gamma correction unit 109 on the video signal under control by a camera microcomputer 111.

Further, a luminance/color information detection unit 110 divides the image in a horizontal direction and a vertical direction to set a plurality of luminance/color information detection frames, and integrates pixel values in the luminance/color information detection frames, thereby detecting luminance information and color information in each of the detection frames of the object. The luminance information and the color information detected by the luminance/color information detection unit 110 are transmitted to the camera microcomputer 111. The camera microcomputer 111 calculates correction values to be used in the white balance correction processing, the edge enhancement processing, and the gamma correction processing with use of acquired object information, such as the luminance and the color, and performs the white balance correction processing, the edge enhancement processing, and the gamma correction processing based on the calculated correction values. Then, a gamma characteristic of the imaging apparatus 100 to be used in the gamma correction processing is a gamma correction curve for high-luminance priority if an imaging mode of the imaging apparatus 100 is a high-luminance priority mode, and a gamma correction curve for normal imaging if the imaging mode of the imaging apparatus 100 is a normal imaging mode. The gamma correction curve for the high-luminance priority will be described in detail below. Further, the present disclosure will omit illustration and a description with respect to other processing performed by the signal processing unit 112 than the white balance correction processing, the edge enhancement processing, the gamma correction processing, and the luminance/color information detection processing.

After being subjected to the signal processing by the signal processing unit 112, the video signal is output to a main body display 116 or is output to an external display 120 via an external interface (I/F) 119. The external I/F 119 can output the video image to an external display apparatus. Examples of the external display apparatus include HDMI (registered trademark), Serial Digital Interface (SDI), Composite, Component, and the like. The camera microcomputer 111 can detect whether the external display 120 is connected to the external I/F 119.

The main body display 116 is a display unit provided in the imaging apparatus 100. The image (a moving image/a still image) captured by the image sensor 105, and an image reproduced from a recording medium, such as a memory card 118, a magnetic tape 115, and a digital versatile disk (DVD) 117, can be displayed on the main body display 116. Further, various kinds of setting information, a menu screen, and the like are displayed on the main body display 116. In the present exemplary embodiment, the main body display 116 is a touch panel capable of receiving a touch operation onto a screen. The main body display 116 is, for example, an organic electroluminescence (EL) display, and a luminance setting thereof that will be described below is a luminance setting of light emitted by the organic EL display itself. However, the main body display 116 is not limited to the organic EL display, and a display using another method, such as a liquid crystal display, may be employed therefor. In the case where the main body display 116 is the liquid crystal display, the luminance setting is a luminance setting of backlight.

Although not illustrated in FIG. 1, the same display content as the main body display 116 can also be displayed on an electronic viewfinder (EVF) 204, which will be described below with reference to FIG. 2. The external display 120 is not configured to be included in the imaging apparatus 100 but is an external apparatus, connectable via the external I/F 119, such as a television, a professional-use display for confirming the video image, and a tablet-type personal computer (PC). Further, the signal subjected to the signal processing by the signal processing unit 112 is recorded into the magnetic tape 115, the DVD 117, or the memory card 118.

Further, the camera microcomputer 111 controls accumulation, readout, and the like of the signal at the image sensor 105 via a sensor control unit 106. Further, the camera microcomputer 111 controls focusing, zooming, and the like of the lenses 101 via a lens control unit 103. Further, the camera microcomputer 111 controls the diaphragm 102 via a diaphragm control unit 104 based on the luminance information and the color information detected by the luminance/color information detection unit 110. Further, the camera microcomputer 111 controls an exposure by controlling a shutter speed via the sensor control unit 106. Further, the camera microcomputer 111 corrects a camera shake at the time of the imaging by driving the lenses 101 via the lens control unit 103 or controlling the signal processing unit 112.

The camera microcomputer 111 is a control unit that controls the entire imaging apparatus 100, and is a processor, such as a central processing unit (CPU). A read only memory (ROM) 111a is a nonvolatile recording medium that stores a constant and various kinds of setting values for an operation of the camera microcomputer 111, and a program for realizing various kinds of flowcharts that will be described below. A random access memory (RAM) 111b is a work memory for the operation of the camera microcomputer 111. The camera microcomputer 111 develops the program recorded in the ROM 111a into the RAM 111b and executes the developed program, thereby realizing processing illustrated in the various kinds of flowcharts that will be described below.

Figure 2:
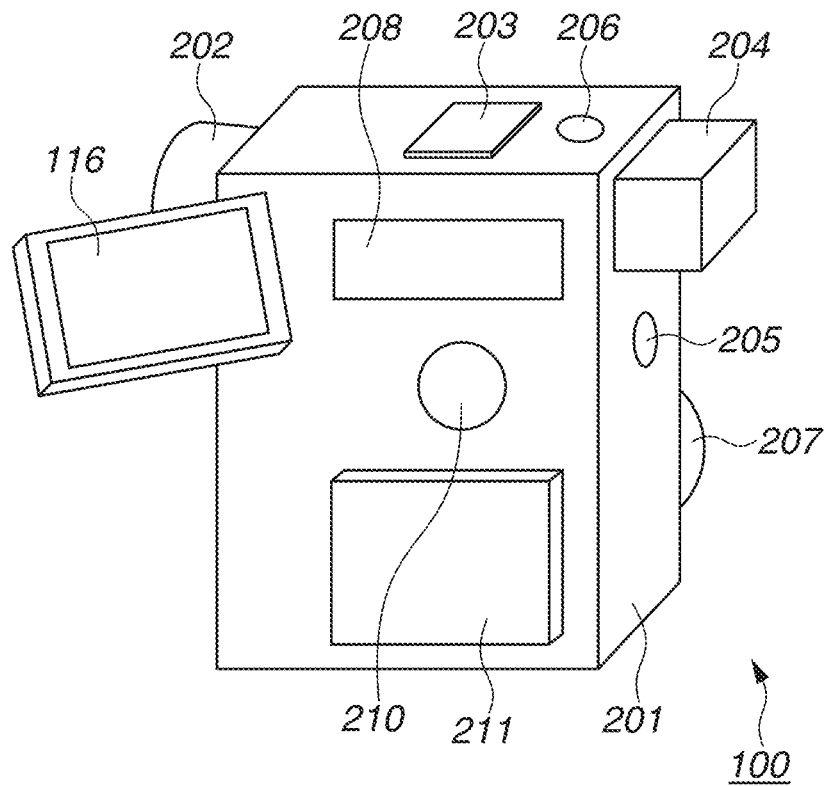
FIG. 2 is a perspective view illustrating an external appearance of the imaging apparatus.

FIG. 2 is a perspective view illustrating an external appearance of the imaging apparatus 100. In FIG. 2, a main body portion 201 is a main body portion of the imaging apparatus 100. A detachable recording medium, such as the DVD 117, the magnetic tape 115, and the memory card 118, is contained inside the imaging apparatus 100, allowing the imaging apparatus 100 to record and reproduce the video signal and the still image. The imaging apparatus 100 may include a built-in recording medium. A lens unit 202 is a lens unit including the lenses 101. A microphone 203 is a sound collection unit provided to record a sound at the time of the imaging. The EVF 204 is an electronic viewfinder (Electronic View Finder). The user can confirm a current content of a setting and a live view (hereinafter referred to as an LV) of the object being imaged when imaging the object by the camera, by looking into the EVF 204.

A moving image trigger switch 205 is a push button, and is a switch with which the user operates to instruct the imaging apparatus 100 to start and end the imaging of the moving image (the recording of the moving image). A still image trigger switch 206 is a push button, and is a switch with which the user operates to instruct the imaging apparatus 100 to start and end the imaging of the still image. A mode dial 207 is a rotational switch with which the user can select any of "REPRODUCE" for setting a mode to a reproduction mode, "CAMERA" for setting the mode to a camera mode, and "OFF" that is none of them. In the present exemplary embodiment, the imaging apparatus 100 has three modes, which are the camera mode, the reproduction mode, and the power-off, selectable with use of the mode dial 207, but may be configured such that the mode can be switched to another mode (for example, a communication mode for wirelessly communicating with an external apparatus).

An operation switch group 208 is a switch and a key for the user to operate the main body, and includes, for example, a key for inputting an image-quality filter mode, and keys for another menu operation, a reproduction-related operation, and the like. Further, the operation switch group 208 also includes, for example, a menu button for displaying the menu screen, an arrow key including an up key, a down key, a left key, and a right key to be used in, for example, an operation for selecting an item from choices, and a set button to be used in an operation, such as entering the selection.

The main body display 116 is provided in a vari-angle monitor rotatably coupled to the main body portion 201. The vari-angle monitor is rotatable around two axes, i.e., an axial direction from a closed position where a display surface of the main body display 116 faces the main body portion 201 to an opened state, and an axial direction from an opened position where the display surface faces a user side (a side where the EVF 204 is located) in the opened state to an inverted opened position where the display surface faces an object side. FIG. 2 illustrates an example in which the vari-angle monitor is located at the opened position. A speaker 210 is a sound generation unit for outputting the sound when the moving image is reproduced and outputting an alarm sound. A battery 211 is a power source unit configured detachable from the main body portion 201.

<Gamma Characteristics in High-Luminance Priority Mode and Normal (Standard) Mode>

The imaging apparatus 100 allows the user, to image the object, to select which to use (an imaging gamma mode) the normal (standard) gamma characteristic or the gamma characteristic for the high-luminance priority, as the gamma characteristic (the gamma correction curve) at the time of the imaging. The imaging apparatus 100 sets the mode to the high-luminance priority mode (a Highlight Priority mode, hereinafter may be abbreviated as an HP mode) if the gamma characteristic for the high-luminance priority is used, and sets the mode to the standard mode if the normal gamma characteristic is used. The imaging gamma mode is set by, for example, an operation on a screen for switching the imaging gamma mode, which will be described below with reference to FIG. 6B, and a result of this setting (the HP mode or the standard mode) is held in the RAM 111b.

Figure 3A:
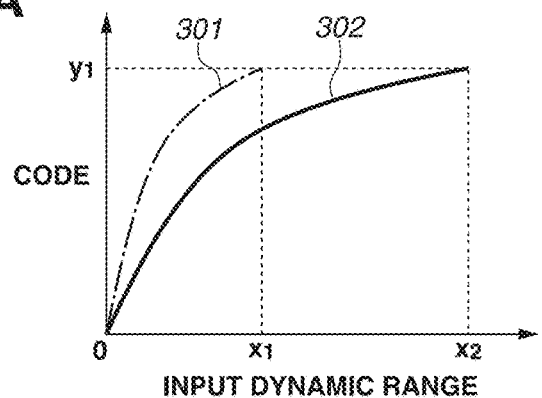
FIGS. 3A to 3C are diagrams each illustrating gamma characteristics.
Figure 3B:
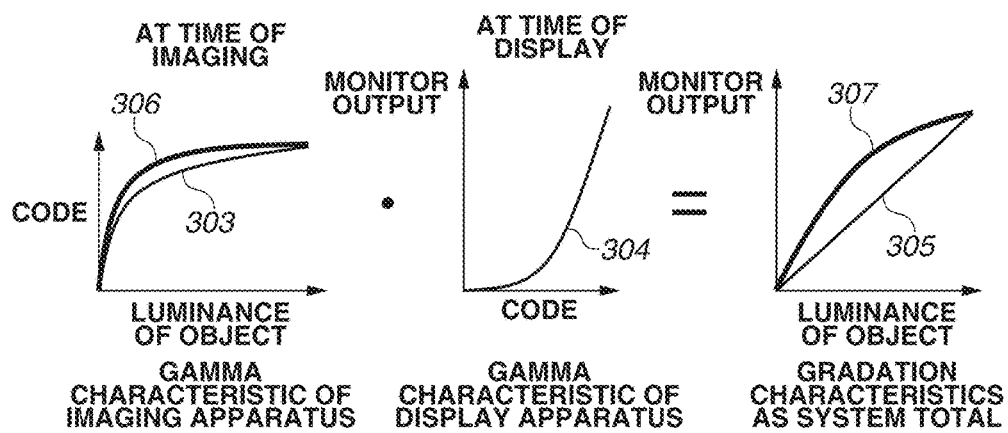
Figure 3C:
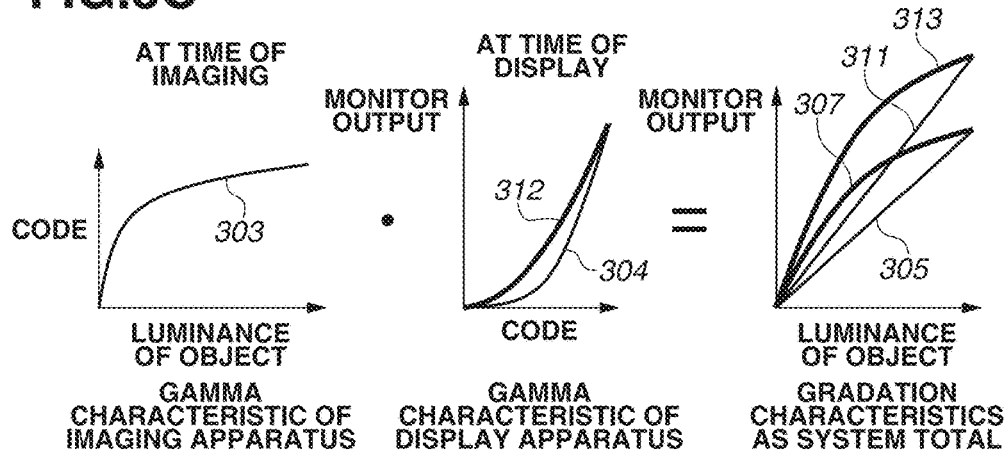

Next, the gamma correction characteristic for the high-luminance priority mode will be described with reference to FIGS. 3A to 3C. FIGS. 3A to 3C illustrate the gamma characteristic for the high-luminance priority mode of the imaging apparatus 100. In FIG. 3A, a gamma characteristic 301 is a gamma characteristic corresponding to an input dynamic range $x_1$, and is a gamma characteristic standardized under, for example, International Telecommunication Union Radiocommunication Sector (ITU-R) Broadcasting Service (BT). 709. A gamma characteristic 302 is a gamma characteristic corresponding to an input dynamic range $x_2$, and indicates an input dynamic range extended to a practical range. The gamma characteristic 302 is formulated as a characteristic that maintains a constant relationship of an output code to an input code and fixes bit allocation from low luminance to high luminance without compressing a contrast of a part of the gamma characteristic if the gamma characteristic 301 is taken as a basis.

FIG. 3B illustrates examples of the gamma characteristic for the high-luminance priority and the normal (standard) gamma characteristic. A gamma characteristic 303 (a second gradation characteristic) is the gamma characteristic for the high-luminance priority in the imaging apparatus 100 (the image sensor 105), which is used when luminance (an imaging signal) of the object is converted into a gradation value (a video signal) in the HP mode. A gradation characteristic 305 can be acquired as a system total that is a total of the gamma characteristic 303 at the time of the imaging and a gamma characteristic 304 at the time of the display (a gamma characteristic when the image is output on the main body display 116). In the gradation characteristic 305 when the HP mode is used, a linear characteristic can be realized in an entire region from a low-luminance portion to a high-luminance portion without the contrast compressed even in a region from the intermediate luminance to the high luminance.

Now, assuming that $y=f(x)$ represents the gamma characteristic of the imaging apparatus 100 corresponding to the input dynamic range $x_1$ serving as a reference, a gamma characteristic of the imaging apparatus 100 when the input dynamic range $x_1$ is extended by t times can be acquired by modifying $y=f(x)$ into $y=f(x/t)$. The input dynamic range may be set appropriately for each product, may be set appropriately for each imaging mode in the same product, or may be set adaptively for each imaging scene in the same imaging mode.

In this manner, the use of the HP mode can prevent the contrast from being compressed due to the gamma correction processing regardless of the input dynamic range, thereby allowing a further natural gradation, color reproducibility, and sharpness to be realized in the entire region from a dark portion to a highlight portion. Especially, the gradation, the color reproducibility, and the sharpness can be significantly improved with respect to shininess of metal, transparency of water, three-dimensionality of a blue sky and a cloud, a skin tone, and the like.

On the other hand, a gamma characteristic 306 (a first gradation characteristic) is a gamma characteristic of the imaging apparatus 100 (the image sensor 105) to be used when the luminance (the imaging signal) of the object is converted into the gradation value in the normal (standard) mode. A gradation characteristic 307 can be acquired as the system total that is a total of the gamma characteristic 306 at the time of the imaging and the gamma characteristic 304 at the time of the display (the gamma characteristic when the image is output on the main body display 116). The gamma characteristic 303 in the HP mode exhibits a higher gradation quality on a high-luminance side between the gamma characteristic 303 in the HP mode and the gamma characteristic 306 in the normal mode. In other words, a larger number of gradation values (code values) are allocated to the high-luminance side in terms of the luminance of the object. Conversely, the gamma characteristic 303 in the HP mode exhibits a lower gradation quality on a low-luminance to intermediate-luminance side between the gamma characteristic 303 in the HP mode and the gamma characteristic 306 in the normal mode. In other words, a smaller number of gradation values (code values) are allocated to the low-luminance to intermediate-luminance side in terms of the luminance of the object. Therefore, the gradation characteristic 307, which is acquired when the video image captured with use of the normal (standard) mode is displayed, leads to an unintentional reduction in a change in the luminance at the high-luminance portion compared to the gradation characteristic of the actual object, resulting in lower reality (the natural gradation, the color reproducibility, and the sharpness) than the gradation characteristic 305. That is, when the video image captured with use of the normal mode is displayed, a blown-out color (a highlight detail loss) more likely occurs at the high-luminance portion of the object than the video image reproduced when the video image captured with use of the HP mode is displayed. Further, when the video image captured with use of the HP mode is displayed, the gradation appears smoother at the high-luminance portion of the object than the video image reproduced when the video image captured with use of the normal mode is displayed. Therefore, the video image captured with use of the HP mode can provide improved visibility of the high-luminance portion, such as the shininess of metal, the transparency of water, and the three-dimensionality of a blue sky and a cloud. On the other hand, the gradation characteristic 307 of the portion from the low luminance to the intermediate luminance becomes higher than the gradation characteristic of the actual object, the portion from the low luminance to the intermediate luminance therefore appears brighter than the image using the gradation characteristic 305.

Figure 4:
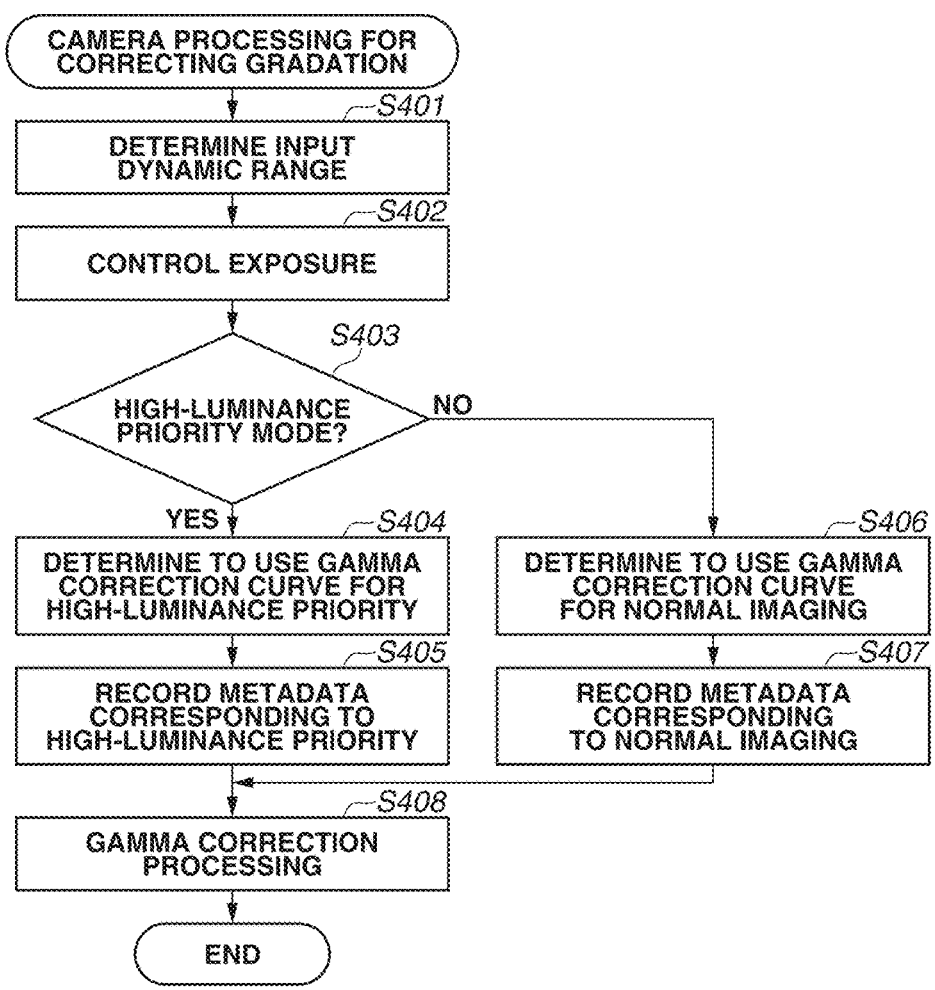
FIG. 4 is a flowchart illustrating processing for the gamma characteristic which is employed at the time of imaging.

Next, the gamma correction processing and metadata recording processing in the high-luminance priority mode, which are performed by the camera microcomputer 111 of the imaging apparatus 100, will be described with reference to a flowchart illustrated in FIG. 4. FIG. 4 is a flowchart illustrating processing for correcting the camera gradation that is performed by the imaging apparatus 100. This processing is processing repeatedly performed when the imaging apparatus 100 is activated in the camera mode and the imaging of the live view (LV) is started, and applied to both the LV image and the captured image for the recording after the recording of the moving image is started. The processing illustrated in FIG. 4 is processing focusing on and detailing a portion corresponding to a process for displaying the LV and a process for recording the moving image prepared differently for each of the gamma characteristics that are performed in camera mode processing, which will be described below with reference to FIGS. 5A and 5B.

In step S401, the camera microcomputer 111 determines the input dynamic range. The input dynamic range according to the present exemplary embodiment is either a predetermined value preset for each of a plurality of imaging modes included in the camera mode, or a value calculated based on the luminance information and the color information detected by the luminance/color information detection unit 110. In step S402, the camera microcomputer 111 controls the exposure based on the luminance information and the color information detected by the luminance/color information detection unit 110.

In step S403, the camera microcomputer 111 determines whether the imaging gamma mode held in the RAM 111b is the high-luminance priority mode (the HP mode). If the held imaging gamma mode is the high-luminance priority mode (YES in step S403), the processing proceeds to step S404, in which the camera microcomputer 111 determines to use the gamma correction curve for the high-luminance priority as the gamma correction characteristic for the gamma correction processing. In step S405, the camera microcomputer 111 records metadata corresponding to the high-luminance priority mode regarding the image to be captured. The metadata to be recorded is a flag for indicating the high-luminance priority mode, the input dynamic range, a preset magnification ratio of display luminance to a reference value, a peak luminance value, gamma shape information and a base gamma of the imaging apparatus 100, and/or the like.

On the other hand, if the camera microcomputer 111 determines that the held imaging gamma mode is not the high-luminance priority mode but the standard mode in step S403 (NO in step S403), in step S406, the camera microcomputer 111 determines to use the gamma correction curve for the normal imaging as the gamma correction characteristic for the gamma correction processing. In step S407, the camera microcomputer 111 records metadata corresponding to the standard mode regarding the image to be captured. The metadata to be recorded is a flag for indicating the normal imaging mode, the input dynamic range, the preset magnification ratio of the display luminance to the reference value, the peak luminance value, the gamma shape information and the base gamma of the imaging apparatus 100, and/or the like.

In step S408, the camera microcomputer 111 performs the gamma correction processing based on the determined gamma correction characteristic. Then, the processing for correcting the camera gradation is ended. The camera microcomputer 111 repeats the processing for correcting the camera gradation until the camera mode is ended.

<Camera Mode Processing>

Figure 5A:
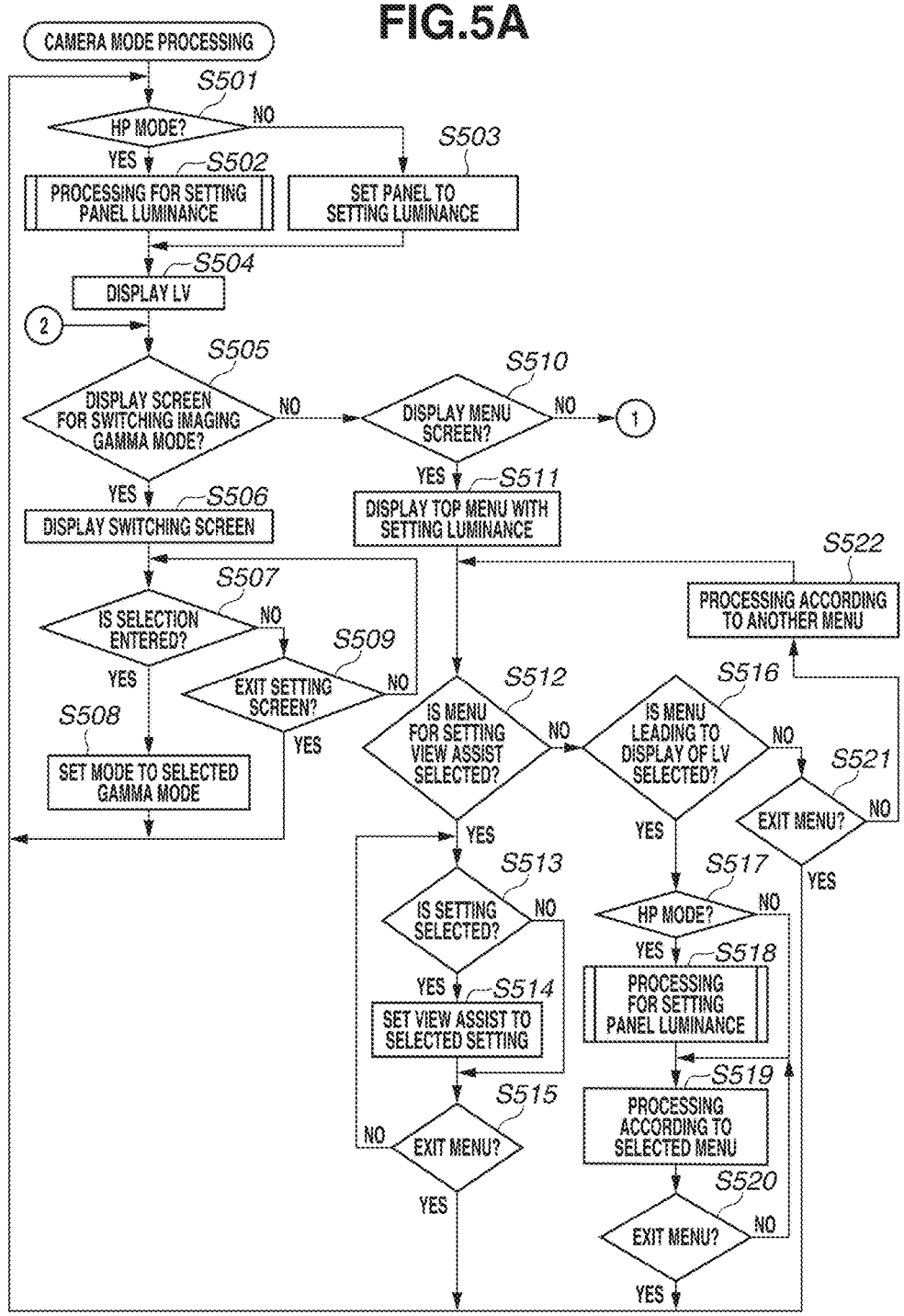
FIGS. 5A and 5B are flowcharts illustrating camera mode processing.
Figure 5B:
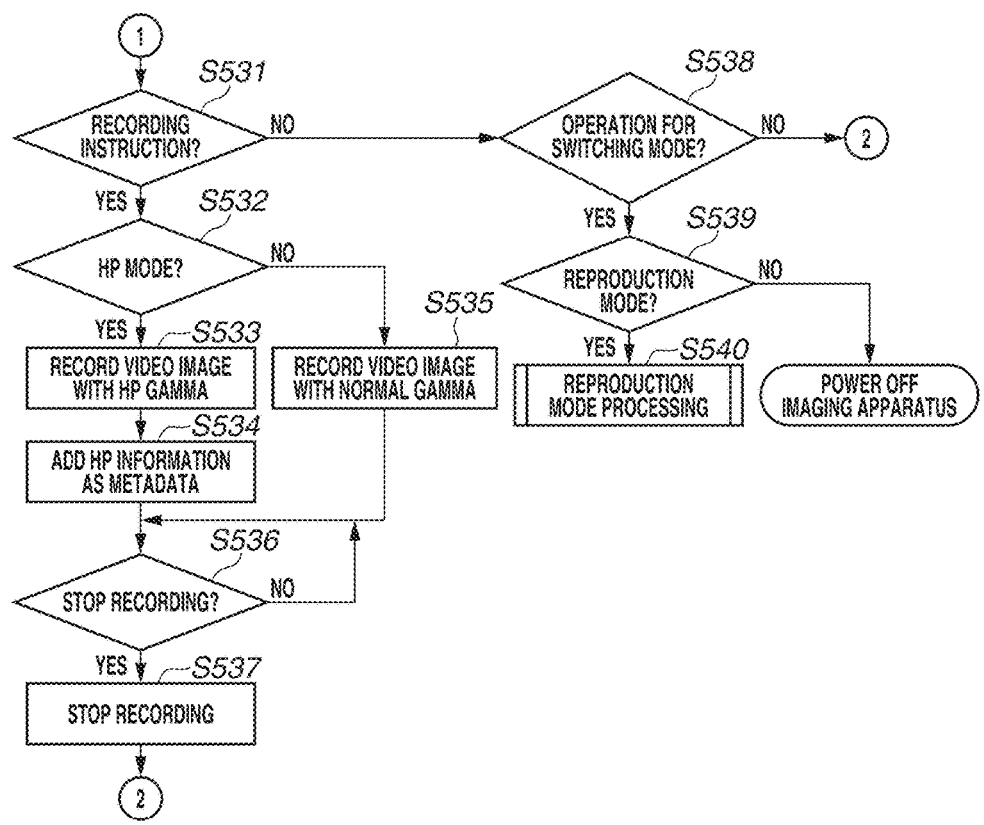

FIGS. 5A and 5B illustrate flowcharts of the camera mode processing performed by the imaging apparatus 100. The processing illustrated in FIG. 5A is started when the imaging apparatus 100 is activated in the camera mode.

In step S501, the camera microcomputer 111 determines whether the imaging gamma mode held in the RAM 111b is the high-luminance priority mode (the HP mode). If the imaging gamma mode is the HP mode (YES in step S501), the processing proceeds to step S502. If the imaging gamma mode is not the HP mode (NO in step S501), the processing proceeds to step S503.

Figure 6A:
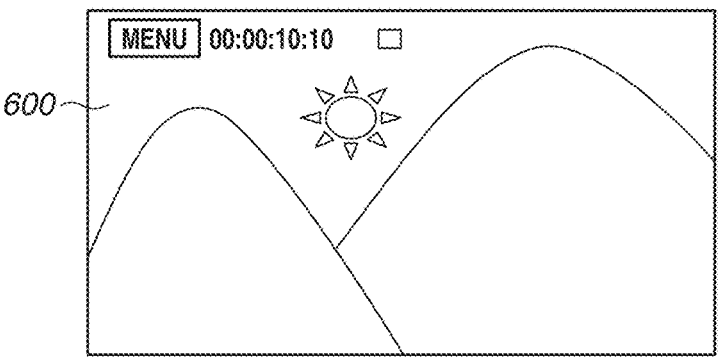
FIGS. 6A to 6D are diagrams each illustrating a display example in the camera mode processing.

In step 3502, the camera microcomputer 111 performs processing for setting panel luminance (which will be described below with reference to a flowchart illustrated in FIG. 8). In step S503, the camera microcomputer 111 reads out user setting luminance for the main body display 116 that is stored in the ROM 111a, and presents a display on the main body display 116 with the user setting luminance. The setting luminance of the main body display 116 is set from a luminance setting screen, like an example that will be described below with reference to FIG. 6D. Further, if a monitor gamma has been changed when a view assist is set to ON, the camera microcomputer 111 presents the display according to a normal monitor gamma after resetting the changed monitor gamma to a setting before the change. Hereinafter, when the following paragraphs include the phrase "presenting the display on the main body display 116 with the user setting luminance", the employed monitor gamma is not the monitor gamma changed when the view assist is set to ON (a gamma characteristic 312, which will be described below) but the normal monitor gamma (the gamma characteristic 304, which will be described below). In step S504, the camera microcomputer 111 displays the video data (the LV image) captured by the image sensor 105 and subjected to the signal processing by the signal processing unit 112 on the main body display 116. FIG. 6A illustrates a display example of an LV image 600 on the main body display 116. This screen is displayed with the luminance according to the processing for setting the panel luminance in step S502, if the imaging gamma mode is the HP mode.

In step S505, the camera microcomputer 111 determines whether an instruction to display the screen for switching the imaging gamma mode on the main body display 116 is issued. If the instruction to display the switching screen is issued (YES in step S505), the processing proceeds to step S506. If not (NO in step S505), the processing proceeds to step S510.

Figure 6B:
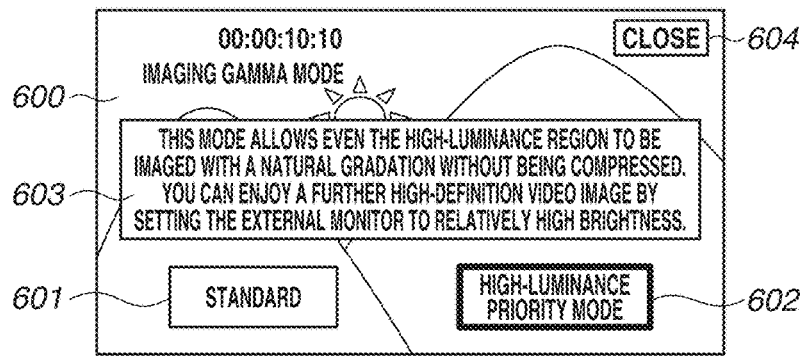

In step S506, the camera microcomputer 111 generates the switching screen (a screen for setting the imaging gamma mode), like an example illustrated in FIG. 6B, and displays the generated switching screen on the main body display 116. A choice 601 for selecting the standard mode (a first mode) and a choice 602 for selecting the HP mode (a second mode) as the imaging gamma mode are displayed on the screen for switching the imaging gamma mode. When any of the choices 601 and 602 is selected by the arrow key or a touch operation, an explanation (a guide) regarding the selected choice is displayed. In the example illustrated in FIG. 6B, because the choice 602 for selecting the HP mode is selected, a guide 603, which is an explanation regarding the HP mode, is displayed. The displayed guide 603 reads as follows: "This mode allows even the high-luminance region to be imaged with a natural gradation without being compressed. You can enjoy a further high-definition video image by setting the external monitor to relatively high brightness." In other words, the displayed guide 603 presents an explanation indicating how the image can be captured in the HP mode and a message prompting the user to increase the setting luminance of the external monitor.

In step S507, the camera microcomputer 111 determines whether any of the choices 601 and 602 (the standard mode or the high-luminance priority mode) is selected and an operation for entering the selection is performed by the user on the switching screen. When the set button is pressed or a close icon 604 is touched with any of the choices 601 and 602 selected, the camera microcomputer 111 determines to use the selected imaging gamma mode (sets the selected imaging gamma mode). If any of the choices 601 and 602 is selected and the operation for entering the selection is performed by the user on the switching screen (YES in step S507), the processing proceeds to step S508. If not (NO in step S507), the processing proceeds to step S509.

In step S508, the camera microcomputer 111 determines the imaging gamma mode selected by the user in step S507, and holds the determined imaging gamma mode into the RAM 111b. The determined imaging gamma mode may be recorded into the ROM 111a. In step S509, the camera microcomputer 111 determines whether an operation for closing the switching screen is performed. If the operation for closing the switching screen is performed (YES in step S509), the processing proceeds to step S501. If not (NO in step S509), the processing proceeds to step S507. Examples of the operation for closing the switching screen include pressing of the menu button.

On the other hand, if the instruction to display the screen for switching the imaging gamma mode is not issued in step S505 (NO in step S505), the processing proceeds to step S510, in which the camera microcomputer 111 determines whether an instruction operation for displaying the menu screen is performed. Examples of the instruction operation for displaying the menu screen include the pressing of the menu button. If the instruction operation for displaying the menu screen is performed (YES in step S510), the processing proceeds to step S511. If not (NO in step S510), the processing proceeds to step S531.

In step S511, the camera microcomputer 111 reads out the user setting luminance for the main body display 116 that is held in the ROM 111a, and displays a top menu of the menu screen on the main body display 116 with the user setting luminance. In other words, even when the luminance of the main body display 116 has been increased to a higher setting than the user setting luminance set by the user because a view assist setting has been turned on and the imaging gamma mode has been the HP mode, the luminance is reset to the user setting luminance according to the switching of the display to the menu screen. This is because the menu screen is a screen where a video image that is not the captured image is displayed (a screen where the captured image is not displayed).

In step S512, the camera microcomputer 111 determines whether a menu item for setting the view assist is selected from among a plurality of menu items included in the menu screen. If the menu item for setting the view assist is selected (YES in step S512), the processing proceeds to step S513. If not (NO in step S512), the processing proceeds to step S516. In step S513, the camera microcomputer 111 displays a screen for setting the view assist on the main body display 116, and determines whether a setting is selected by the user.

Figure 6C:
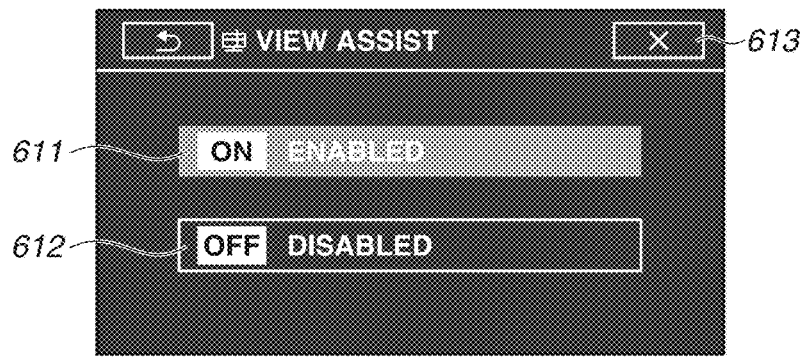

FIG. 6C illustrates a display example of the screen for setting the view assist on the main body display 116. A choice 611 for turning on (enabling) the view assist, and a choice 612 for turning off (disabling) the view assist are displayed on the screen for setting the view assist, and the user can select and set any of them. The view assist is an assist function regarding visibility of when the image is captured in the HP mode and of when the image captured in the HP mode is reproduced and displayed on the main body display 116. If the view assist is set to ON, the luminance of the main body display 116 is automatically increased (the luminance is automatically changed) when the live view image captured in the HP mode is displayed and when the image captured in the HP mode is reproduced and displayed. The view assist is applied not only when the imaging apparatus 100 is in the camera mode but also when the video image recorded in the HP mode is reproduced and displayed in the reproduction mode or the like.

The input gamma characteristic in the HP mode that is employed at the time of the imaging is the gamma characteristic for expressing the entire region from the dark portion to the highlight portion with a more natural gradation by linearizing the gradation characteristic as the system total, which is the total of the input gamma characteristic and the output gamma characteristic when the image is displayed and output on the main body display 116, with respect to the luminance. However, when the video image having the gradation characteristic linearized with respect to the luminance is displayed, the intermediate luminance and the low luminance are unintentionally darkened compared to the video image recorded with the normal input gamma characteristic, although the natural gradation can be attained. The view assist function is provided to improve appearances of these intermediate luminance and low luminance, and turning on the view assist setting can increase the display luminance of the main body display 116 and display the intermediate luminance and the low luminance so as not to be darkened. If the view assist setting is turned OFF, the display luminance is not automatically increased even when the imaging gamma mode is the HP mode.

If an operation for selecting any of the choices 611 and 612 is performed with an operation on the up or down key of the arrow key or a touch operation onto the choice 611 or the choice 612 (YES in step S513), the processing proceeds to step S514. In step S514, the camera microcomputer 111 holds the setting selected in step S513 (ON/OFF of the view assist) into the RAM 111b. This setting may be recorded into the ROM 111b so as to be kept held even after the imaging apparatus 100 is powered off. If the setting of the view assist is changed from ON to OFF, the view assist is stopped. In other words, the HP moving image displayed after this change is displayed in such a state that the luminance of the main body display 116 that has been increased at the time of the view assist is reset to the setting before the increase, or the monitor gamma is reset to the setting before the change if the monitor gamma has been changed when the view assist has been set to ON. In step S515, the camera microcomputer 111 determines whether an operation for closing the screen for setting the view assist (the pressing of the menu button or a touch operation onto a close icon 613) is performed. If the operation for closing the screen for setting the view assist is performed (YES in step S515), the processing proceeds to step S501. If not (NO in step S515), the processing proceeds to step S513.

In step S516, the camera microcomputer 111 determines whether a menu item for transitioning to a setting screen where the LV image (the video data) subjected to the signal processing by the signal processing unit 112 is displayed in the background is selected among the plurality of menu items included in the menu screen. Examples of the menu item for transitioning to the setting screen where the LV image is displayed in the background include the luminance setting, soft zooming control for selecting whether to add inertia to a start point and an end point at the time of a zooming operation, and a zooming speed level for changing a zooming speed at the time of the zooming operation. Regarding these menu items, displaying the LV image in the background allows the user to further easily recognize a change in the setting. If the menu item for transitioning to the setting screen where the LV image is displayed in the background is selected (YES in step S516), the processing proceeds to step S517. If not (NO in step S516), the processing proceeds to step S521.

In step S517, the camera microcomputer 111 determines whether the imaging gamma mode held in the RAM 111b is the high-luminance priority mode. If the held imaging gamma mode is the HP mode (YES in step S517), the processing proceeds to step S518. If the held imaging gamma mode is not the HP mode (NO in step S517), the processing proceeds to step S519. In step S518, the camera microcomputer 111 performs the processing for setting the panel luminance (which will be described below with reference to the flowchart illustrated in FIG. 8). In step S519, the camera microcomputer 111 displays the setting screen (the setting screen where the LV image is displayed in the background) according to the menu item selected in step S516, and changes a setting according to an operation for changing the setting input from the user.

Figure 6D:
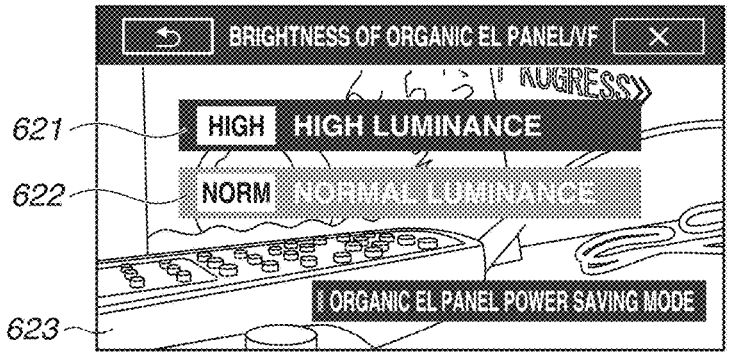

FIG. 6D illustrates a display example of the luminance setting screen as an example of the setting screen according to the menu item selected in step S516. This screen is a setting screen displayable together with the image captured in the HP mode that is under a hierarchical level of the menu screen. The user can select and set any of setting values of two levels as the luminance of the main body display 116 on the luminance setting screen. A choice 621 for the high luminance (HIGH) and a choice 622 for the normal luminance (NORM) are displayed on the luminance setting screen while being superimposed on an LV image 623. When the user selects any of the choices 621 and 622 with an operation on the up/down key or a touch operation, the luminance is set to the selected luminance, and the LV image 623 is displayed with the selected luminance. The user can set the luminance to his/her desired luminance while confirming an appearance of the LV image 623 in the background. The selected luminance is recorded into the ROM 111a, and is applied to the display of when the imaging gamma mode is not the HP mode and the display of when the imaging gamma mode is the HP mode but the view assist function is turned OFF. Hereinafter, the luminance set on this screen will be referred to as the "user setting luminance". In the present exemplary embodiment, there are two levels prepared as the luminance levels selectable by the user as the user setting luminance, but the imaging apparatus 100 may be configured in such a manner that the user can select the luminance from as many levels as three or more.

In step S520, the camera microcomputer 111 determines whether an operation for closing the setting screen displayed in step S519 is performed. If the operation for closing the displayed setting screen is performed (YES in step S520), the processing proceeds to step S501. If the operation for closing the displayed setting screen is not performed (NO in step S520), the processing proceeds to step S519.

In step S521, the camera microcomputer 111 determines whether an operation for closing the menu screen is performed. If the operation for closing the menu screen is performed (YES in step S521), the processing proceeds to step S501. If not (NO in step S521), the processing proceeds to step S522. In step S522, the camera microcomputer 111 performs other processing according to another menu item selected on the menu screen. Examples of the other processing (other setting processing) include a setting regarding an image quality of the moving image to be captured, a setting regarding an automatic focus (AF) method, and the like.

In step S531, the camera microcomputer 111 determines whether the moving image trigger switch 205 is pressed. If the moving image trigger switch 205 is pressed (YES in step S531), the processing proceeds to step S532. If not (NO in step S531), the processing proceeds to step S538. In step S532, the camera microcomputer 111 determines whether the imaging gamma mode held in the RAM 111b is the HP mode. If the camera microcomputer 111 determines that the held imaging gamma mode is the HP mode (YES in step S532), the processing proceeds to step S533. If the camera microcomputer 111 determines that the held imaging gamma mode is not the HP mode (if the held imaging gamma mode is the standard mode) (NO in step S532), the processing proceeds to step S535.

In step S533, the camera microcomputer 111 starts recording the video image in the HP mode that has been captured by the image sensor 105 and acquired from the signal processing unit 112 into the magnetic tape 115, the DVD 117, or the memory card 118. The video image in the HP mode is the video image acquired with use of the gamma correction curve for the high-luminance priority (the gamma characteristic 303), as described in the description of step S404. In step S534, the camera microcomputer 111 adds attribute information that makes this image identifiable as being captured in the HP mode (hereinafter referred to as HP information), as the metadata of the moving image recorded in step S533. The HP information may be recorded as a header of a moving image file, or may be recorded into a management file associated with the moving image file.

In step S535, the camera microcomputer 111 starts recording the video image in the normal mode that has been captured by the image sensor 105 and acquired from the signal processing unit 112 into the magnetic tape 115, the DVD 117, or the memory card 118. The video image in the normal mode (the standard mode) is the video image acquired with use of the gamma correction curve for the normal imaging (the gamma characteristic 306), as described in the description of step S406.

In step S536, the camera microcomputer 111 determines whether the moving image trigger switch 205 is pressed. If the camera microcomputer 111 determines that the moving image trigger switch 205 is pressed (YES in step S536), the processing proceeds to step S537, in which the camera microcomputer 111 stops recording the moving image, and performs processing for closing the moving image file. On the other hand, if the camera microcomputer 111 determines that the moving image trigger switch 205 is not pressed (NO in step S536), the processing returns to step S536, in which the camera microcomputer 111 continues capturing and recording the moving image.

In step S538, the camera microcomputer 111 determines whether the mode dial 207 is operated. If the camera microcomputer 111 determines that the mode dial 207 is operated (YES in step S538), the processing proceeds to step S539. If not (NO in step S538), the processing proceeds to step S505. In step S539, the camera microcomputer 111 determines whether a result of the operation in step S538 is the reproduction mode. If the camera microcomputer 111 determines that the result of the operation in step S538 is the reproduction mode (YES in step S539), the processing proceeds to step S540 (the mode is switched to the reproduction mode), in which the camera microcomputer 111 performs reproduction mode processing. The reproduction mode processing in step S540 will be described below with reference to FIG. 7. On the other hand, if the camera microcomputer 111 determines that the result of the operation in step S538 is not the reproduction mode in step S539 (NO in step S539), the camera microcomputer 111 powers off the imaging apparatus 100, and the processing is ended.

<Reproduction Mode Processing>

FIG. 7 illustrates a flowchart of the reproduction mode processing performed by the imaging apparatus 100. The processing illustrated in FIG. 7 is started when the imaging apparatus 100 is activated in the reproduction mode or shifts from the camera mode to the reproduction mode. The processing illustrated in FIG. 7 is a detail of the reproduction mode processing performed in step S540 illustrated in FIG. 5B.

In step S701, the camera microcomputer 111 reads out the user setting luminance held in the ROM 111a, and presents the display on the main body display 116 with the user setting luminance. In step S702, the camera microcomputer 111 reads out images stored in the magnetic tape 115, the DVD 117, or the memory card 118, and the attribute information of each of the images, and displays thumbnails of the images in a list on the main body display 116.

Figure 11A:
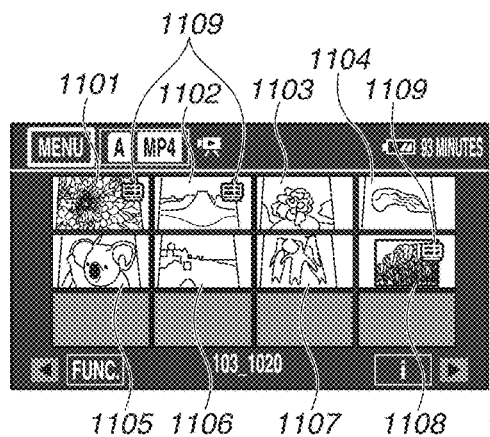
FIGS. 11A to 11E are diagrams each illustrating a display example in the reproduction mode.

FIG. 11A illustrates a display example of the thumbnail list display (an index display or an image display in a multiscreen form) displayed on the main body display 116 in step S702. Thumbnail images 1101 to 1108 are displayed, and thumbnail images corresponding to the images captured in the HP mode among them are displayed with HP icons 1109 added thereto, which indicate that these images are the HP moving images. Hereinafter, the image captured in the HP mode will be referred to as the HP moving image. Further, the image captured in the normal mode and the live view image being captured in the normal mode will be collectively referred to as a first type of image, and the image captured in the HP mode and the live view image being captured in the HP mode will be collectively referred to as a second type of image. In the illustrated example, the moving images represented by the thumbnail images 1101, 1102, and 1108 are the HP moving images. Whether the image is the image captured in the HP mode is identified based on whether the HP information is added to the attribute information of each of the read images. The view assist function does not change the luminance in this thumbnail list display even when the thumbnail of the HP moving image is included therein.

In step S703, the camera microcomputer 111 determines whether a user operation for selecting any of the thumbnail images 1101 to 1108 displayed in the thumbnail list is performed (whether any of the moving images is selected). If any of the thumbnail images 1101 to 1108 is selected (YES in step S703), the processing proceeds to step S704. If not (NO in step S703), the process of step S703 is repeated (the camera microcomputer 111 waits for the selection of the thumbnail image). In step S704, the camera microcomputer 111 starts reproducing and displaying the moving image corresponding to the thumbnail image selected by the user in step S703. More specifically, the camera microcomputer 111 reads out the moving image to be reproduced that is recorded in the magnetic tape 115, the DVD 117, or the memory card 118, reproduces the read moving image by controlling the signal processing unit 112, and displays the reproduced moving image on the main body display 116. Alternatively, the camera microcomputer 111 outputs the moving image from the external I/F 119 to display the reproduced moving image on the external display 120.

Figure 11B:
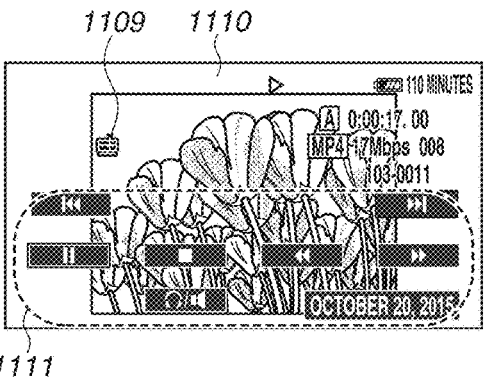
Figure 11C:
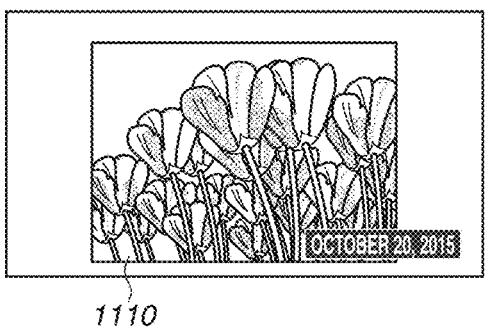

FIGS. 11B and 11C each illustrate a display example during the reproduction of the moving image on the main body display 116. The example illustrated in FIG. 11B is a display example when a button display is "ON" (enabled), and the HP icon 1109 and button icons 1111 are displayed while being superimposed on a reproduced moving image 1110. The button icons 1111 are button icons for performing various kinds of operations (including a stop, fast-forward, and rewind) regarding an operation related to the reproduction of the moving image, and trigger corresponding processing when being touched with a touch operation. The user can switch the button display between "ON" and "OFF" (disabled) (steps S715 and S716). The example illustrated in FIG. 11C is a display example when the button display is "OFF", and the HP icon 1109 and the button icons 1111 are not displayed although the reproduced moving image 1110 is displayed in this example.

In step S705, the camera microcomputer 111 analyzes the attribute information added to the moving image being reproduced, and analyzes whether the HP information is included therein. If the HP information is included in the attribute information of the moving image being reproduced, i.e., the HP moving image is being reproduced (YES in step S705), the processing proceeds to step S706. If not (if the moving image that is not the HP moving image is being reproduced) (NO in step S705), the processing proceeds to step S708. In step S706, the camera microcomputer 111 performs the processing for setting the panel luminance (which will be described below with reference to the flowchart illustrated in FIG. 8). In step S707, the camera microcomputer 111 performs guide display processing (which will be described below with reference to a flowchart illustrated in FIG. 9). On the other hand, if the moving image being reproduced is not the HP moving image (NO in step S705), in step S708, the camera microcomputer 111 reads out the user setting luminance held in the ROM 111a, and displays the moving image on the main body display 116 with the user setting luminance.

In step S709, the camera microcomputer 111 determines whether the moving image being reproduced reaches an end thereof. If the camera microcomputer 111 determines that the moving image being reproduced reaches the end thereof (YES in step S709), the processing proceeds to step S710. If not (NO in step S709), the processing proceeds to step S713. In step S710, the camera microcomputer 111 hides a guide if the guide has been displayed in the process of step S707. In step S711, the camera microcomputer 111 determines whether there is a next moving image stored in the magnetic tape 115, the DVD 117, or the memory card 118. If the camera microcomputer 111 determines that there is a next moving image (YES in step S711), the processing proceeds to step S712. If the camera microcomputer 111 determines that there is no next moving image (NO in step S711), the processing proceeds to step S702. In step S712, the camera microcomputer 111 starts reproducing the next moving image. Then, the processing returns to step S705.

In step S713, the camera microcomputer 111 determines whether a stop operation for stopping the moving image being reproduced is performed. If the stop operation is performed (YES in step S713), the camera microcomputer 111 stops reproducing the moving image, and the processing proceeds to step 3714. If not (NO in step S713), the processing proceeds to step S715. In step S714, the camera microcomputer 111 performs stop screen processing (which will be described below with reference to a flowchart illustrated in FIG. 10).

In step S715, the camera microcomputer 111 determines whether an instruction operation for switching the button display is performed by the user. If the camera microcomputer 111 determines that the instruction to switch the button display is issued (YES in step S715), the processing proceeds to step S716. If not (NO in step S715), the processing proceeds to step S718.

In step S716, the camera microcomputer 111 switches the button display between "ON" and "OFF". More specifically, if the instruction to switch the button display is issued when the button display is "OFF" (FIG. 11C), the camera microcomputer 111 switches the button display to "ON", and displays the button icons 1111 as illustrated in FIG. 11B. This switching also causes the HP icon 1109 to be displayed if the displayed moving image is the HP moving image. On the other hand, if the instruction to switch the button display is issued when the button display is "ON" (FIG. 11B), the camera microcomputer 111 switches the button display to "OFF", and hides the button icons 1111 as illustrated in FIG. 11C. Further, if the displayed moving image is the HP moving image, the camera microcomputer 111 also hides the HP icon 1109 along with hiding the button icons 1111. In step S717, the camera microcomputer 111 performs the guide display processing (which will be described below with reference to the flowchart illustrated in FIG. 9).

In step S718, the camera microcomputer 111 determines whether the mode dial 207 is operated. If the mode dial 207 is operated (YES in step S718), the processing proceeds to step S719. If not (NO in step S718), the processing proceeds to step S709. In step S719, the camera microcomputer 111 determines whether a result of the operation on the mode dial 207 is the camera mode. If the result of the operation on the mode dial 207 is the camera mode (YES in step S719), the processing proceeds to step S720, in which the camera microcomputer 111 switches the processing from the reproduction mode to the camera mode (FIGS. 5A and 5B). On the other hand, if the result of the operation on the mode dial 207 is the power-off (NO in step S719), the camera microcomputer 111 powers off the imaging apparatus 100, and the processing is ended.

<Processing for Setting Panel Luminance>

Figure 8:
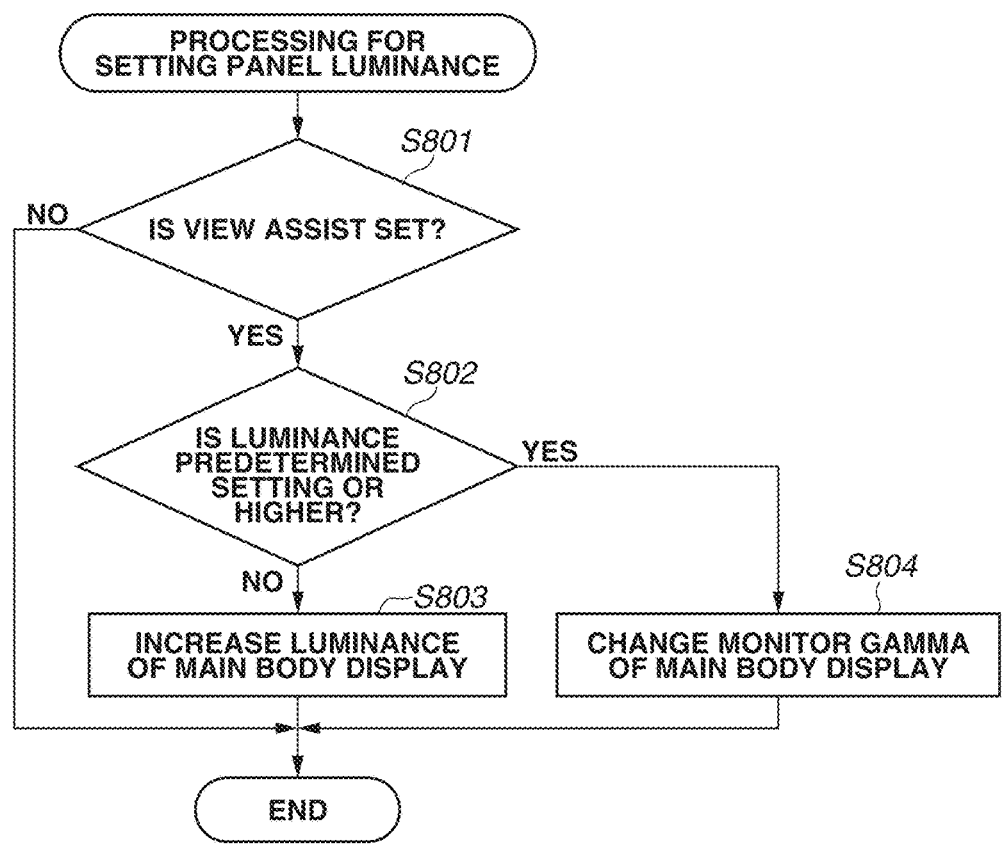
FIG. 8 is a flowchart illustrating processing for setting panel luminance.

FIG. 8 is a flowchart illustrating a detail of the processing for setting the panel luminance that is performed in steps S502 and S518 illustrated in FIG. 5A and step S706 illustrated in FIG. 7. This processing is processing for presenting the display on the main body display 116 with the high luminance independent of the user setting luminance if the mode is the HP mode or the moving image is the HP moving image, and the view assist function is turned on.

In step S801, the camera microcomputer 111 reads out the state of the view assist setting held in the RAM 111b, and determines whether the view assist setting is currently turned on. If the camera microcomputer 111 determines that the view assist is turned on (YES in step S801), the processing proceeds to step S802. If not (NO in step S801), the processing is ended. In step S802, the camera microcomputer 111 reads out information indicating the user setting luminance, which is for the main body display 116, held in the ROM 111a. Then, the camera microcomputer 111 determines whether the user setting luminance is a predetermined luminance setting or higher (a luminance setting that makes the luminance as bright as or brighter than a predetermined value). In the present exemplary embodiment, the camera microcomputer 111 determines whether the user setting luminance is the high luminance (HIGH) based on whether the user setting luminance is the predetermined luminance setting or higher. If the luminance setting value is the predetermined value or higher (the high luminance (HIGH)) (YES in step S802), the processing proceeds to step S804. If not (if the luminance setting value is the normal luminance (NORM)) (NO in step S802), the processing proceeds to step S803.

In the present exemplary embodiment, the processing is branched according to whether the user setting luminance is the high luminance (HIGH) or the normal luminance (NORM) since the settable user luminance settings are the high luminance (HIGH) and the normal luminance (NORM) (FIG. 6D), but is not limited thereto. For example, in a case where the user setting luminance can be set from three or more levels of setting luminance, the process of step S802 may be arranged in such a manner that the processing proceeds to step S804 if the user setting luminance is a maximum value among the settable luminance levels, and proceeds to step S803 if not. Alternatively, for example, in a case where the user setting luminance can be set from five levels of setting luminance, the process of step S802 may be arranged in such a manner that the processing proceeds to step S804 if the user setting luminance is a brightest or second brightest luminance level (if the user setting luminance is 4 or 5 among settable values 1 to 5), and proceeds to step S803 if the user setting luminance is another luminance level.

In step S803, the camera microcomputer 111 controls the luminance of the main body display 116 in such a manner that this luminance matches predetermined luminance for the view assist, so as to exceed the user setting luminance. This control, if the HP moving image is reproduced with the view assist set to ON, leads to a display with the high luminance (HIGH) even with, for example, the user setting luminance set to the normal luminance (NORM). In such a case, if an icon or the like is displayed excessively brightly, burn-in may occur on the main body display 116. Therefore, a display item, such as an icon, may be drawn with lower luminance than the luminance when the view assist setting is turned off so that a display element other than the LV image or the reproduced image, such as the icon, is displayed on the main body display 116 with the same display luminance as the display luminance of when the view assist setting is turned off. In other words, the display item may be drawn with lower brightness. After the camera microcomputer 111 changes the display luminance in this manner, the present processing is ended.

In step S804, the camera microcomputer 111 changes the monitor gamma for the main body display 116 so as to make brightness in the intermediate region higher than the brightness of when the view assist setting is not turned on. Since the user setting luminance is already the high luminance (HIGH) (the settable maximum luminance), a display with higher luminance than that is impossible (the luminance of the main body display 116 cannot be increased more than that). Therefore, when the view assist is on, the camera microcomputer 111 makes luminance of the portion from the low luminance to the intermediate brighter than the luminance of when the view assist setting is not turned on, like the gradation characteristic 307, by changing the gamma characteristic at the time of the display. After the camera microcomputer 111 changes the gamma characteristic in this manner, the present processing is ended.

Since the camera microcomputer 111 determines the user setting luminance in step S802, step S803 is performed every time the processing for setting the panel luminance is performed, while the user setting luminance is set to the normal luminance (NORM). Similarly, step S804 is performed every time the processing for setting the panel luminance is performed, while the user setting luminance is set to the high luminance (HIGH). If step S803 is performed after the user setting luminance is changed from the high luminance to the normal luminance while the view assist is on, the camera microcomputer 111 returns the monitor gamma changed in step S804 to the setting before the change. On the other hand, if step S804 is performed after the user setting luminance is changed from the normal luminance to the high luminance while the view assist is on, the camera microcomputer 111 changes the monitor gamma to the characteristic of when the view assist is on.

The change in the luminance that is made by the view assist will be further described with reference to FIG. 3C. If the display is presented with the gamma characteristic 304 (a first output gamma characteristic) of the main body display 116 when the gamma characteristic of the imaging apparatus 100 is the gamma characteristic 303 in the HP mode, the gradation characteristic 305 linearized with respect to the luminance is acquired as the characteristic as the system total. Presenting the display in this state can achieve excellent reproducibility throughout the entire region in terms of the luminance of the object in the HP mode. However, this display tends to make the intermediate-luminance portion appear darker unintentionally compared to the gradation characteristic 307 at the time of the normal mode. Setting the view assist to ON leads to an increase in the luminance of the main body display 116 in step S803, and thus formulation of the characteristic as the system total like a gradation characteristic 311. As a result, the luminance of the intermediate-luminance portion can be increased, and the visibility can be improved.

In the case where the main body display 116 is, for example, the liquid crystal display, the gradation characteristic 305 can be changed to the gradation characteristic 311 by increasing the luminance of the backlight by x (larger than 1) times. Alternatively, in the case where the main body display 116 is the organic EL display, a gradation characteristic 311 can be acquired by increasing the gamma characteristic of the display by x (larger than 1) (i.e., increasing the luminance of the organic EL display). When the luminance of the organic EL display is increased, the luminance is increased at all tones at the same rate. In other words, the luminance of a brightest tone is also increased. Further, if the user setting luminance is the high luminance (HIGH) when the view assist is turned on, the characteristic as the system total like a gradation characteristic 313 is acquired by employing the gamma characteristic 312 as the gamma characteristic at the time of the display on the main body display 116. The gamma characteristic 312 (a second output gamma characteristic) is a gamma characteristic that displays the intermediate-luminance to low-luminance side more brightly than the gamma characteristic 304. As a result, the appearance of the intermediate portion can be further improved. The luminance of the brightest tone in the gradation characteristic 313 of when the gamma characteristic 312 of the display apparatus is employed is the same as the gradation characteristic 311, but the tones of the low to intermediate portion are increased, improving the appearance of this portion.

<Guide Display Processing>

Figure 9:
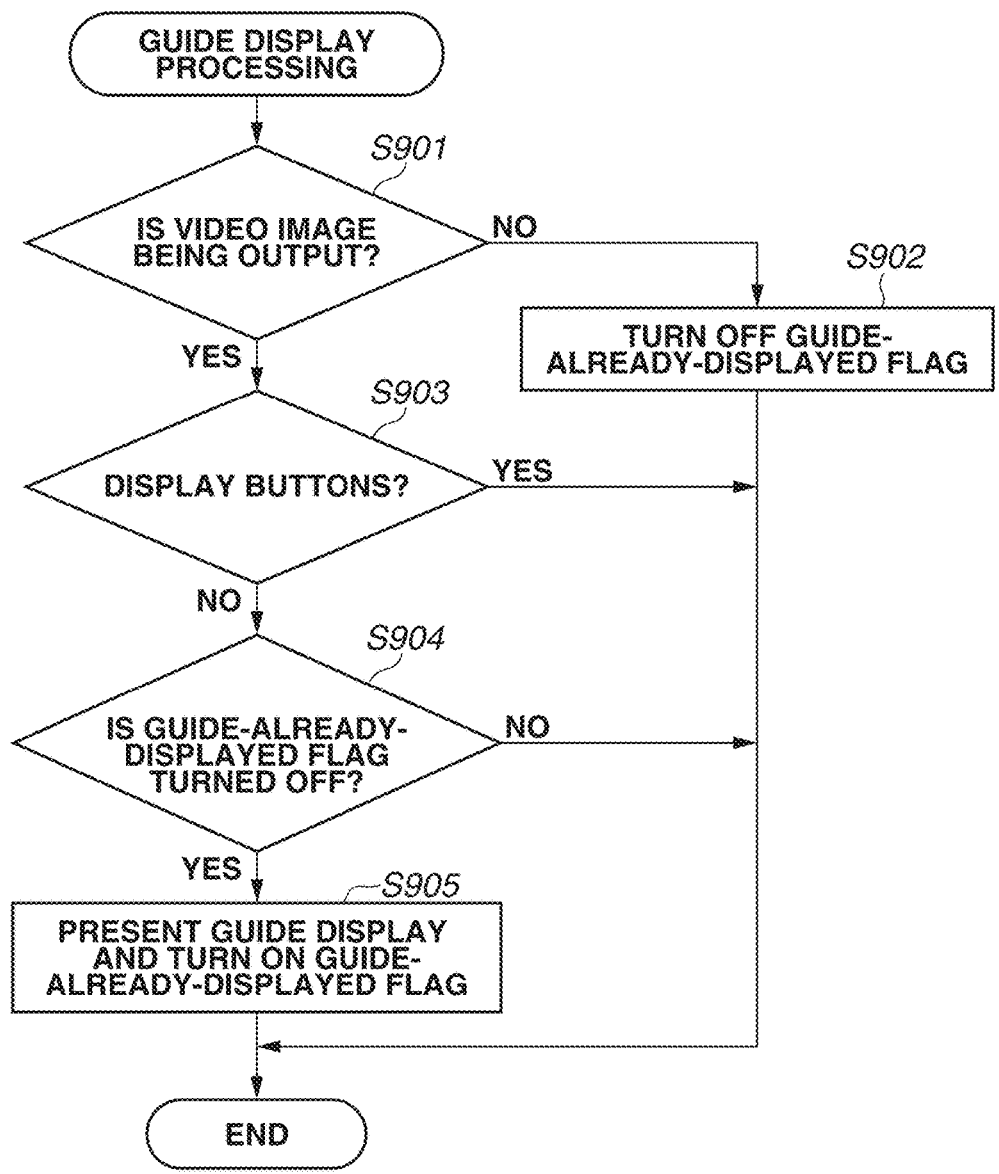
FIG. 9 is a flowchart illustrating guide display processing.

FIG. 9 is a flowchart illustrating a detail of the guide display processing performed in steps S707 and S717 illustrated in FIG. 7. The guide display processing is processing for displaying a guide prompting the user to change the luminance of the external display 120 (increase the luminance) when the HP moving image is reproduced with the external display 120 connected to the external I/F 119.

In step S901, the camera microcomputer 111 determines whether the external display 120 is connected to the external I/F 119, and the video image is being output to the external display 120. If the video image is being output to the external display 120 (YES in step S901), the processing proceeds to step S903. If not (NO in step S901), the processing proceeds to step S902. In step S902, the camera microcomputer 111 turns off a guide-already-displayed flag held in the RAM 111b. This guide-already-displayed flag is used to store whether the guide is already displayed in order to prevent the guide from being displayed again until the external display 120 is disconnected after the guide is displayed once.

In step S903, the camera microcomputer 111 determines whether the setting of the button display is "ON". In other words, the camera microcomputer 111 determines whether the button icons 1111 are in the displayed state. If the button display is "OFF" (NO in step S903), the processing proceeds to step S904. If the button display is "ON" (YES in step S903), the processing is ended at this point. The process in which the processing is ended if the button display is "ON" (YES in step S903) is to prevent the button icons 1111 from being hidden by the guide display, making it impossible for user to issue an instruction for an operation, such as the reproduction and the stop of the moving image.

In step S904, the camera microcomputer 111 confirms whether the guide-already-displayed flag held in the RAM 111b is turned off. If the guide-already-displayed flag is turned off (YES in step S904), the processing proceeds to step S905. If not (NO in step 3904), the processing is ended at this point. In step S905, the camera microcomputer 111 superimposes the guide display prompting the user to change the luminance of the external display apparatus on the video signal output from the external I/F 119 and the video signal displayed on the main body display 116. Further, the camera microcomputer 111 turns on the guide-already-displayed flag held in the RAM 111*b*. The guide display is automatically deleted when a predetermined time period has elapsed since the start of the display in step S905.

Figure 11D:
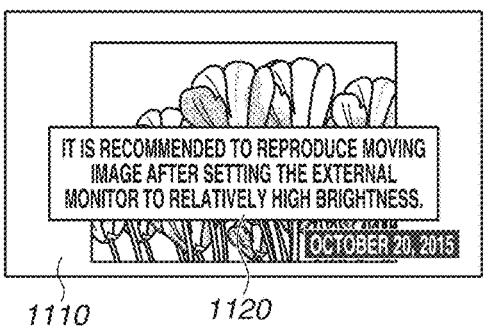

FIG. 11D illustrates a display example of the guide display on the main body display 116 and the external display 120 in step S905. A guide display 1120, which prompts the user to reproduce the moving image after setting the external monitor to relatively high brightness, is displayed while being superimposed on the reproduced moving image 1110, which is the HP moving image. The user can be aware of the fact that the user had better perform an operation for changing the luminance setting of the external display 120 to increase the luminance by himself/herself, by viewing this guide display 1120. The camera microcomputer 111 starts displaying the guide display 1120 if the reproduction of the HP moving image is started for the first time after the external display 120 is connected or if the external display 120 is connected in the middle of the reproduction of the HP moving image. Then, the camera microcomputer 111 hides the guide display 1120 and displays only the reproduced moving image 1110 after the predetermined time period has elapsed since the start of the display of the guide display 1120.

The guide display 1120 is the guide regarding only the external display 120 connected to the external I/F 119. Therefore, the external display 120 may be controlled so as to be displayed only on the video signal output from the external I/F 119 without being displayed on the main body display 116. Further, the imaging apparatus 100 can be set about whether to permit or prohibit superimposition of a display item, such as a character display, onto the image output from the external I/F 119. Then, the display may be controlled so as to permit only this guide display 1120 to be superimposed (the guide display 1120 to be output while being superimposed on the HP moving image) even when the superimposition is set to the prohibition. This control can reduce a possibility that the user may end up viewing the moving image with the external display apparatus remaining set to an inappropriate luminance setting (the luminance setting that causes the portion from the low luminance to the intermediate luminance in the gradation characteristic of the HP moving image to unintentionally appear darker than the image captured with the normal gamma).

The above-described guide display processing illustrated in FIG. 9 has been described, by way of example, assuming that this processing is performed in step S707 (i.e., when the reproduction of each moving image is started) and in step S717 (i.e., after the button display is switched) illustrated in FIG. 7, but is not limited thereto. This processing may be performed at a timing when the connection of the external display 120 to the external I/F 119 is detected. More specifically, upon detecting that the external display 120 is connected to the external I/F 119 in the middle of the reproduction of the moving image, the camera microcomputer 111 determines whether the moving image being reproduced at this moment is the HP moving image. Then, if this moving image is the HP moving image, the camera microcomputer 111 outputs the guide display 1120 prompting the user to change the luminance of the external display apparatus from the external I/F 119 to the external display 120. Further, if the HP moving image is included in a plurality of moving images to be reproduced when the plurality of moving images is continuously reproduced, the guide display 1120 prompting the user to change the luminance of the external display apparatus may be output from the external I/F 119 (output while being superimposed on the moving image) before a first moving image is reproduced. For example, if receiving an instruction to continuously reproduce N moving images from a first moving image to an N-th moving image based on a playlist, the camera microcomputer 111 determines whether at least one HP moving image is included in these N moving images. Then, if at least one HP moving image is included, the camera microcomputer 111 performs the guide display processing illustrated in FIG. 9 when the reproduction of the first moving image is started even when the moving image to be reproduced first is not the HP moving image. Then, the camera microcomputer 111 outputs the guide display 1120 prompting the user to change the luminance of the external display apparatus from the external I/F 119 if the video image is being output outward. Alternatively, the camera microcomputer 111 may be configured to calculate a time period left until a start of the reproduction of the HP moving image included in the moving image list and display the guide when this time period reduces to a predetermined time period or shorter, instead of displaying the guide display 1120 when the first moving image is reproduced. In other words, the camera microcomputer 111 outputs the guide display 1120 from the external I/F 119 when the time period left until the start of the reproduction of the HP moving image reduces to the predetermined time period even during the reproduction of the normal moving image, when continuously reproducing the plurality of moving images and outputting them from the external I/F 119.

Further, not only displaying the guide display 1120 when the moving image is reproduced, but also the camera microcomputer 111 may be configured to display the guide display 1120 when the thumbnail, a filename, or the like representing the HP moving image is displayed on the screen where, for example, the moving images are displayed in the list. Further, in this case, not only simply presenting the guide display 1120 when the thumbnail, the filename, or the like representing the HP moving image is displayed, but also the camera microcomputer 111 may be configured to present the guide display 1120 when a display of a selection cursor or the like overlaps the thumbnail, the filename, the HP icon 1109, or the like representing the HP moving image. More specifically, the camera microcomputer 111 outputs the guide display 1120 when the information for identifying the HP moving image or the display item (the HP icon 1109) indicating that this moving image is the HP moving image is selected at the time of the output of the screen where the plurality of images including the normal image and the HP moving image is listed. The information for identifying the HP moving image is the thumbnail, the filename, or the like.

Further, the example illustrated in FIG. 9 has been described assuming that the guide display 1120 is presented if the button display is off (NO in step S903) by way of example, but the guide display processing may be performed so as to present the guide display 1120 even when the button display is on. Further, the guide display processing may be performed so as to acquire the information indicating the luminance setting set to the external display 120 from the external I/F 119, and refrain from presenting the guide display 1120 if the luminance setting of the external display 120 is a setting as bright as or brighter than a predetermined setting value.

<Processing Regarding Screen where Moving Image is Stopped>

Figure 10B:
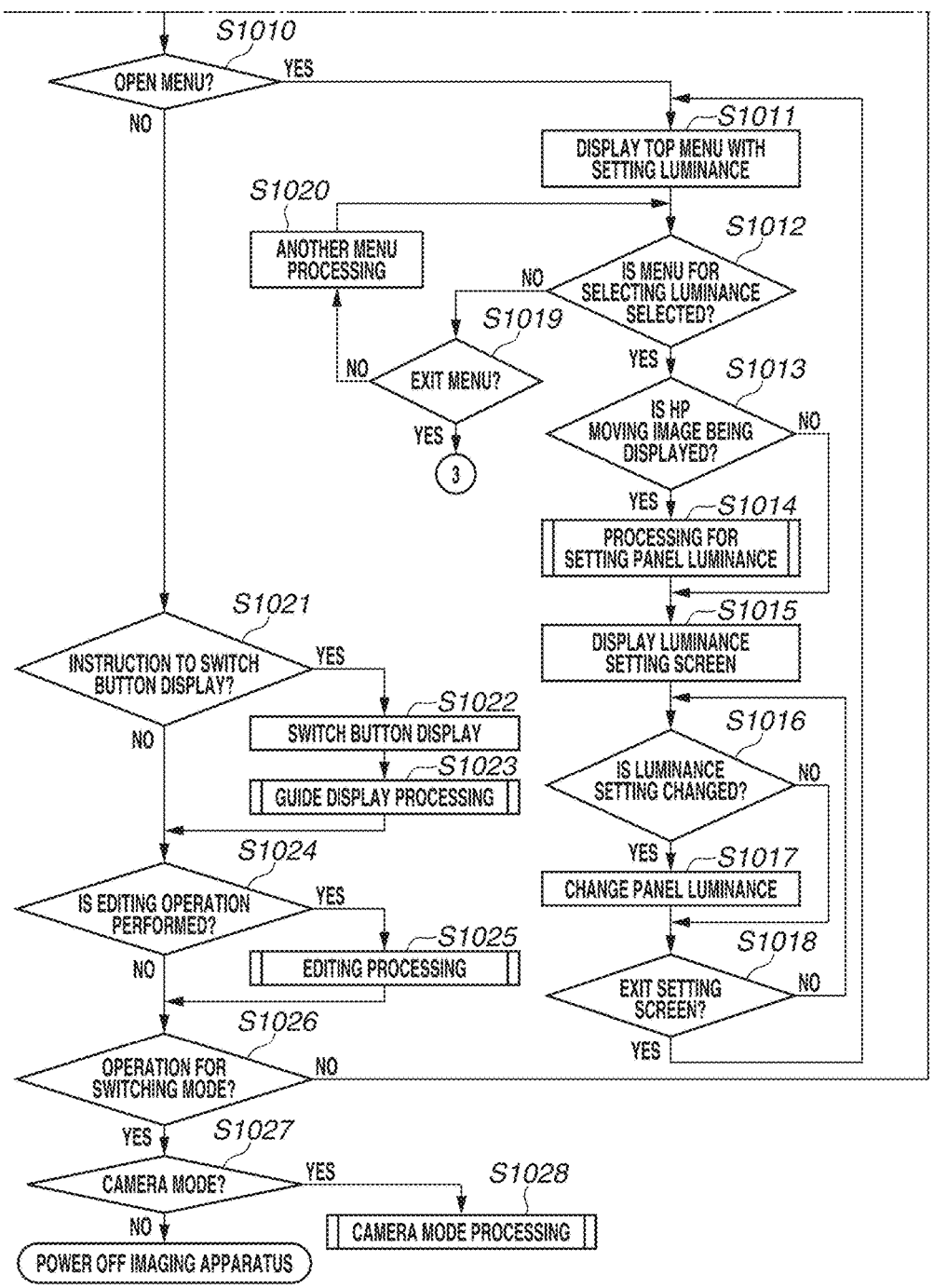
FIG. 10 is a diagram including the flowcharts of FIGS. 10A and 10B.

FIG. 10 is a flowchart illustrating a detail of the processing regarding the screen where the moving image is stopped, which is performed in step S714 illustrated in FIG. 7. The processing regarding the screen where the moving image is stopped is processing performed when the reproduction of the moving image is stopped from the state in which the moving image is being reproduced in the reproduction mode processing.

Figure 11E:
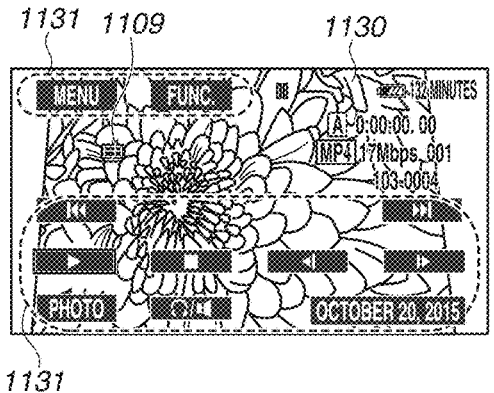

In step S1001, the camera microcomputer 111 displays a button-equipped stop screen on the main body display 116. More specifically, a button icon is displayed first when the moving image is stopped regardless of whether the setting of the button display during the reproduction of the moving image is "ON" or "OFF". FIG. 11E illustrates a display example at this time. The camera microcomputer 111 displays a button icon group 1131 while superimposing the button icon group 1131 on a stopped moving image 1130. At this time, the camera microcomputer 111 also displays the HP icon 1109 if the stopped moving image 1130 is the HP moving image.

In step S1002, the camera microcomputer 111 determines whether an operation for advancing a scene (an operation for selecting a next moving image) is performed by the user with an operation on the operation switch group 208 or a touch operation onto the button icon. If the camera microcomputer 111 determines that the operation for advancing the scene is performed (YES in step S1002), the processing proceeds to step 31003. If not (NO in step S1002), the processing proceeds to step S1009. In step S1003, the camera microcomputer 111 reads out the next moving image scene from the magnetic tape 115, the DVD 117, or the memory card 118, performs decoding processing, and analyzes the metadata (the attribute information) of the moving image scene.

In step S1004, the camera microcomputer 111 determines whether the next moving image scene is the HP moving image from the metadata analyzed in step S1003. More specifically, the camera microcomputer 111 determines whether the HP information is added to the attribute information of the moving image of the next scene. If the camera microcomputer 111 determines that the next moving image scene is the HP moving image (YES in step S1004), the processing proceeds to step S1005. If the camera microcomputer 111 determines that the next moving image scene is not the HP moving image (NO in step S1004), the processing proceeds to step S1007.

In step S1005, the camera microcomputer 111 performs the processing for setting the panel luminance that has been described above with reference to FIG. 8. In step S1006, the camera microcomputer 111 performs the guide display processing described above with reference to FIG. 9. In step S1007, the camera microcomputer 111 reads out the user setting luminance recorded in the RAM 111b or the ROM 111a, and sets the luminance of the main body display 116 to the read user setting luminance. In this process, if the user setting luminance is the normal luminance (NOPM), the moving image of the previous scene is the HP moving image, and the view assist function is on, this step leads to a change and an automatic reduction in the luminance of the main body display 116 according to the transition to the next normal moving image. In step S1008, the camera microcomputer 111 displays a frame of the moving image of the next scene decoded in step S1003 on the main body display 116 as the stop screen equipped with the button display.

In step S1009, the camera microcomputer 111 determines whether an instruction operation for reproducing the displayed moving image is performed by the user with an operation on the operation switch group 208 or an touch operation. If the camera microcomputer 111 determines that the instruction operation for reproducing the displayed moving image is performed by the user (YES in step S1009), the processing proceeds to step S704 illustrated in FIG. 7, in which the camera microcomputer 111 starts reproducing the moving image selected by the operation for advancing the scene. If the instruction operation for reproducing the displayed moving image is not performed (NO in step S1009), the processing proceeds to step S1010.

In step S1010, the camera microcomputer 111 determines whether an operation for opening the menu is performed by the user with an operation on the operation switch group 208 or a touch operation. If the camera microcomputer 111 determines that the operation for opening the menu is performed by the user (YES in step S1010), the processing proceeds to step S1011. If not (NO in step S1010), the processing proceeds to step S1021.

In step S1011, the camera microcomputer 111 reads out the user setting luminance set on the menu from the RAM 111b or the ROM 111a, and adjusts the luminance of the main body display 116 in such a manner that this luminance matches the read user setting luminance. Further, the camera microcomputer 111 displays a top hierarchical level (the top menu) of the menu on the main body display 116.

In step S1012, the camera microcomputer 111 determines whether the item of the luminance setting menu is selected by the user from among the plurality of menu items included in the menu screen with an operation on the operation switch group 208 or a touch operation. The luminance setting menu is the menu for setting the luminance (the user setting luminance) of the main body display 116, and the moving image is also displayed in a paused state while the luminance setting menu is displayed. If the camera microcomputer 111 determines that the luminance setting menu is selected (YES in step S1012), the processing proceeds to step S1013. If not (NO in step S1012), the processing proceeds to step S1019.

In step S1013, the camera microcomputer 111 determines whether the paused moving image is the HP moving image (whether the HP information is added) from the attribute information of the paused moving image. If the camera microcomputer 111 determines that the paused moving image is the HP moving image (YES in step S1013), the processing proceeds to step S1014. If not (NO in step S1013), the processing proceeds to step S1015. In step S1014, the camera microcomputer 111 performs the processing for setting the panel luminance that has been described with reference to FIG. 8.

In step S1015, the camera microcomputer 111 displays the luminance setting screen on the main body display 116. The luminance setting screen is a similar screen to the screen described with reference to FIG. 6D. However, the image displayed in the background is not the LV image but the stopped video image of the reproduced moving image that has been displayed until immediately before that. In step S1016, the camera microcomputer 111 determines whether the luminance setting is changed (whether a choice of a luminance setting different from the set user setting luminance is selected) by the user with an operation on the operation switch group 208 or a touch operation. This is similar to the process exemplified by the display example illustrated in FIG. 6D and step S519 illustrated in FIG. 5A. If the camera microcomputer 111 determines that the luminance setting is changed (YES in step S1016), the processing proceeds to step S1017. If the camera microcomputer 111 determines that the luminance setting is not changed (NO in step S1016), the processing proceeds to step S1018.

In step S1017, the camera microcomputer 111 stores the set luminance into the ROM 111a as the user setting luminance, and also changes the luminance of the main body display 116 in such a manner that the luminance of the main body display 116 matches the set luminance. In this process, the stopped video image of the reproduced moving image is displayed in the background on the luminance setting screen, whereby the user can set the luminance to his/her desired luminance while confirming the appearance of the video image. Assume that the processing for setting the panel luminance in step S1014 is not performed again when the luminance is changed. This is because, if the moving image is displayed with the high luminance (HIGH) regardless of the user setting luminance for the reason that this video image is the HP moving image and the view assist function is on, even changing the luminance to the normal luminance (NORM) does not cause a reduction in the display luminance by the processing for setting the panel luminance. If the luminance is not reduced according to the change to the normal luminance (NORM) in this manner, the user cannot get feedback indicating that the luminance change has succeeded.

However, the present processing may be configured such that the processing for setting the panel luminance in step S1014 is performed again if the displayed image is the HP moving image and the luminance is changed from the normal luminance (NORM) to the high luminance (HIGH). Configuring the present processing in this manner allows the employed display gamma (monitor gamma) to be changed provided that the displayed image is the HP moving image and the view assist is turned on, resulting in improvement of the appearance of the HP moving image. Further, this configuration can also make the user aware of the change in the setting because the display state is changed according to the change in the user setting luminance.

In step S1018, the camera microcomputer 111 determines whether an operation for exiting the luminance setting screen is performed by the user with an operation on the operation switch group 208 or a touch operation. If the camera microcomputer 111 determines that the operation for exiting the setting screen is performed (YES in step S1018), the processing proceeds to step S1011. If not (NO in step S1018), the processing proceeds to step S1016.

In step S1019, the camera microcomputer 111 determines whether an operation for exiting the menu screen is performed by the user with an operation on the operation switch group 208 or a touch operation. If the camera microcomputer 111 determines that the operation for exiting the menu screen is performed (YES in step S1019), the processing proceeds to step S1001. If not (NO in step S1019), the processing proceeds to step S1020. In step S1020, the camera microcomputer 111 performs other menu processing according to selected another menu item.

In step S1021, the camera microcomputer 111 determines whether an instruction to switch the button display is issued by the user with an operation on the operation switch group 208 or a touch operation. If the camera microcomputer 111 determines that the instruction to switch the button display is issued (YES in step S1021), the processing proceeds to step S1022. If not (NO in step S1021), the processing proceeds to step S1024.

In step S1022, the camera microcomputer 111 switches the button display between "ON" and "OFF". If the button display is switched from "ON" to "OFF", the camera microcomputer 111 hides the button icon group 1131, which has been displayed as illustrated in FIG. 11E. In this process, if the displayed image is the HP moving image, the camera microcomputer 111 also hides the HP icon 1109. On the other hand, if the button display is switched from "OFF" to "ON", the camera microcomputer 111 displays the button icon group 1131 as illustrated in FIG. 11E from the state in which the button icon group 1131 is not displayed. In this process, if the displayed image is the HP moving image, the camera microcomputer 111 also displays the HP icon 1109. In step S1023, the camera microcomputer 111 performs the guide display processing illustrated in FIG. 9.

In step S1024, the camera microcomputer 111 determines whether an instruction to perform an editing operation is issued by the user with an operation on the operation switch group 208 or a touch operation. If the camera microcomputer 111 determines that the instruction to perform the editing operation is issued (YES in step S1024), the processing proceeds to step S1025. If not (NO in step S1024), the processing proceeds to step S1026. In step S1025, the camera microcomputer 111 performs editing processing (which will be described below with reference to a flowchart illustrated in FIG. 12).

In step S1026, the camera microcomputer 111 determines whether an operation for switching the mode is performed by the user with an operation on the mode dial 207. If the camera microcomputer 111 determines that the operation for switching the mode is performed (YES in step 31026), the processing proceeds to step S1027. If not (NO in step S1026), the processing proceeds to step S1002. Further, in step S1027, the camera microcomputer 111 detects a position of the mode dial 207 operated by the user, and determines whether the detected position is a position corresponding to the camera mode. If the camera microcomputer 111 determines that the detected position is the position corresponding to the camera mode (YES in step S1027), the processing proceeds to step S1028, in which the camera microcomputer 111 performs the camera mode processing. If the position of the mode dial 207 is not the position corresponding to the camera mode (if the position of the mode dial 207 is a position corresponding to the power-off) (NO in step S1027), the camera microcomputer 111 performs processing for powering off the imaging apparatus 100, and the present processing is ended. The camera mode processing performed in step S1028 is the processing described with reference to the flowcharts illustrated in FIGS. 5A and 5B.

<Editing Processing>

Figure 12A:
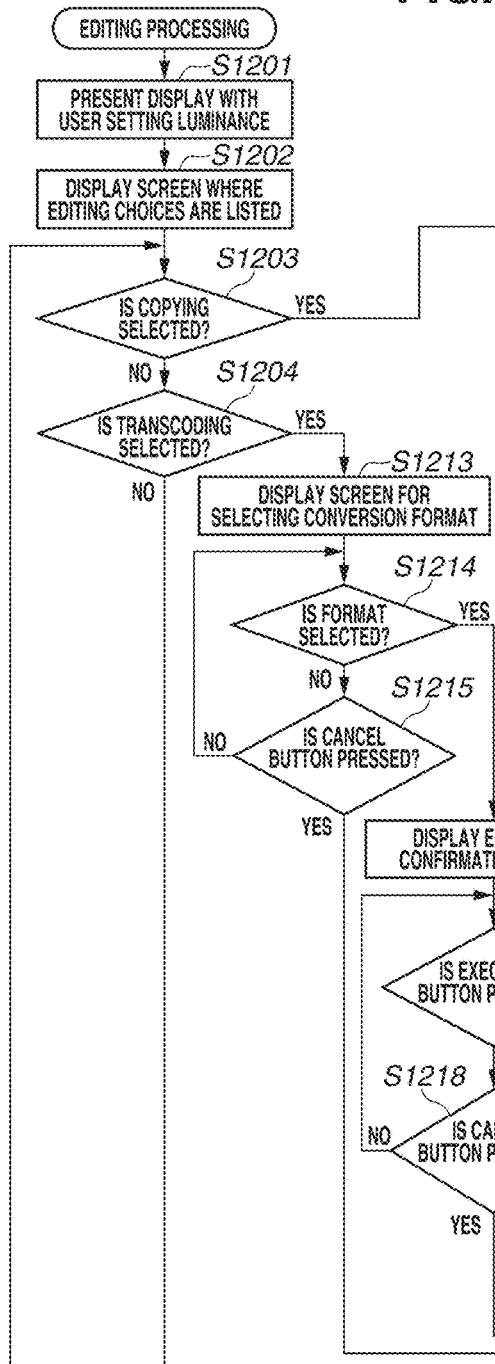
FIG. 12 is a diagram including the flowcharts of FIGS. 12A and 12B.
Figure 12:
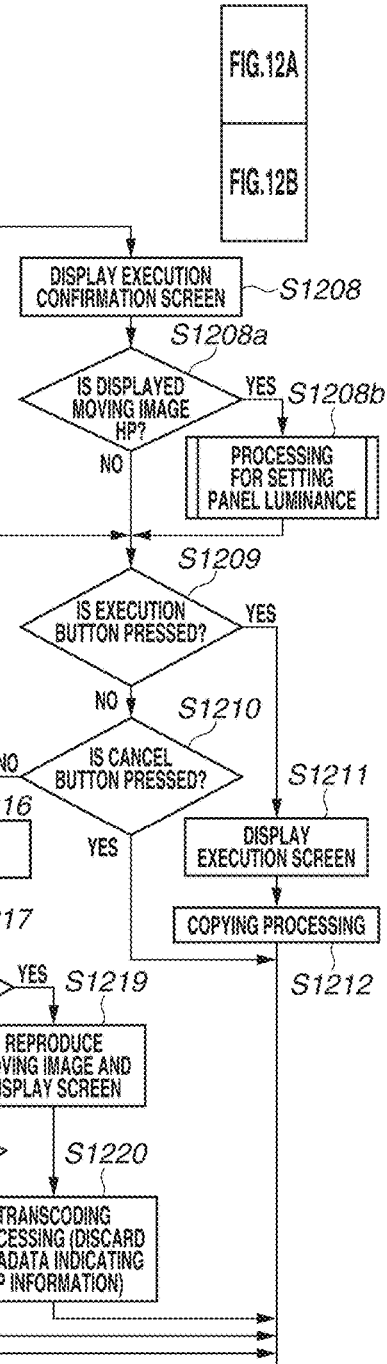
Figure 12B:
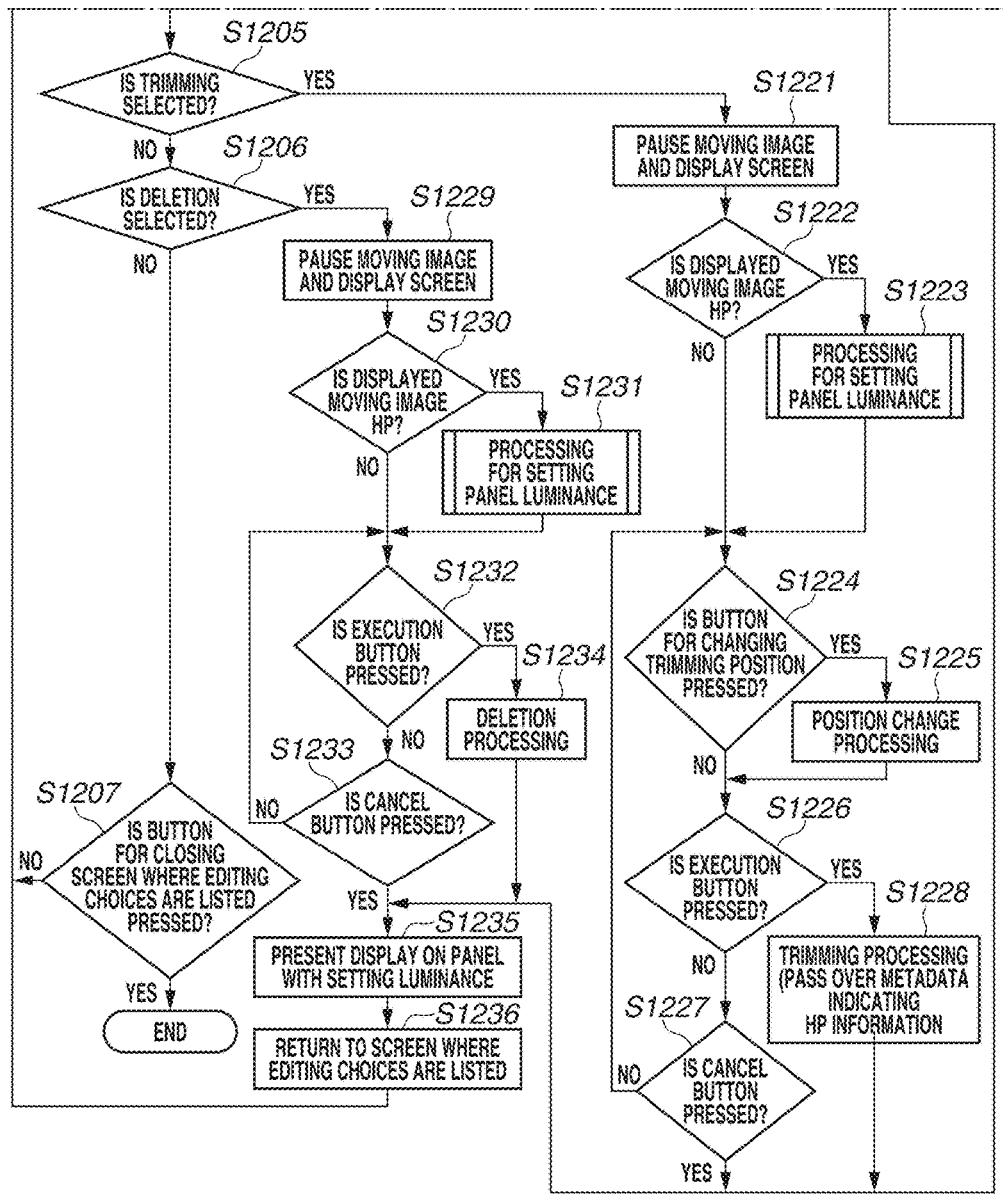

FIG. 12 is a flowchart illustrating a detail of the editing processing performed in step S1025 illustrated in FIG. 10. This editing processing is performed when the editing instruction is issued from the state in which the moving image is displayed while being stopped (i.e., a state in which a moving image that is an editing target is specified) in the reproduction mode processing. As described above, the information indicating that the image is captured in the HP mode is added to the image (or the video image) as the specific attribute information regarding the gradation characteristic at the time of the imaging. In the following description, copying and trimming will be described as an example of editing processing in which, if the specific attribute information indicating that the image is captured in the above-described HP mode is added to the image before the editing, this specific attribute information is also added to the image after the editing. Further, transcoding will be described as an example of editing processing in which, even when the specific attribute information is added to the image before the editing, the specific attribute information is not added to the image after the editing.

Figure 13A:
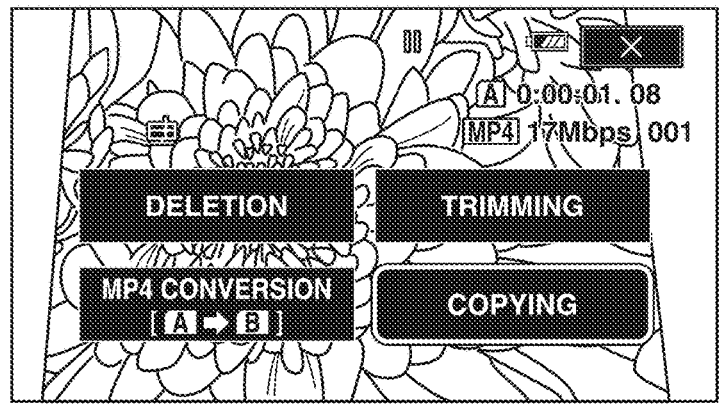
FIGS. 13A to 13C are diagrams each illustrating a display example in the editing processing.

In step S1201, the camera microcomputer 111 presents the display on the main body display 116 with the user setting luminance recorded in the RAM 111*b* or the ROM 111*a*. In step S1202, the camera microcomputer 111 displays a screen where editing choices are listed on the main body display 116. FIG. 13A illustrates a display example of the screen where the editing choices are listed. The screen where the editing choices are listed is a screen where a plurality of choices is displayed regarding which editing operation the user wants to perform on the moving image specified as the editing target (the specified moving image) that has been displayed immediately before that. In the present exemplary embodiment, four choices of editing operations, namely, deletion, trimming, transcoding (a conversion of Moving Picture Experts Group-4 Part 14 (MP4), i.e., a format conversion), and copying are displayed as the choices. Each of the choices can be selected with a touch or the arrow key and the enter button included in the operation switch group 208.

In step S1203, the camera microcomputer 111 determines whether the copying choice is selected by the user with an operation on the operation switch group 208 or a touch operation. If the camera microcomputer 111 determines that the copying choice is selected (YES in step S1203), the processing proceeds to step S1208. If not (NO in step S1203), the processing proceeds to step S1204. In step S1204, the camera microcomputer 111 determines whether the transcoding choice is selected by the user with an operation on the operation switch group 208 or a touch operation. If the camera microcomputer 111 determines that the transcoding choice is selected (YES in step S1204), the processing proceeds to step S1213. If not (NO in step S1204), the processing proceeds to step S1205.

In step S1205, the camera microcomputer 111 determines whether the trimming choice is selected by the user with an operation on the operation switch group 208 or a touch operation. If the camera microcomputer 111 determines that the trimming choice is selected (YES in step S1205), the processing proceeds to step S1221. If not (NO in step S1205), the processing proceeds to step S1206. In step S1206, the camera microcomputer 111 determines whether the deletion choice is selected by the user with an operation on the operation switch group 208 or a touch operation. If the camera microcomputer 111 determines that the deletion choice is selected (YES in step S1206), the processing proceeds to step S1229. If not (NO in step S1206), the processing proceeds to step S1207.

In step S1207, the camera microcomputer 111 determines whether an operation for closing the screen where the editing choices are listed is performed by the user with an operation on the operation switch group 208 or a touch operation. If the camera microcomputer 111 determines that the operation for closing the screen where the editing choices are listed is performed (YES in step S1207), the camera microcomputer 111 closes the screen where the editing choices are listed, and ends the editing processing. Then, the processing proceeds to step S1026 illustrated in FIG. 10. If the camera microcomputer 111 determines that the operation for closing the screen where the editing choices are listed is not performed (NO in step S1207), the processing proceeds to step S1203.

In step S1208, the camera microcomputer 111 displays a screen for confirming the execution of the copying on the main body display 116. This screen for confirming the execution of the copying is not displayed with the user setting luminance but displayed with the luminance for the HP moving image if the moving image is the HP moving image and the view assist function is on, by processes of next steps, steps S1208a and S1208b. In step S1208a, the camera microcomputer 111 analyzes the attribute information of the displayed moving image, and determines whether the HP information is added thereto. If the camera microcomputer 111 determines that the HP information is added (YES in step S1208a), the processing proceeds to step S1208b. If not (NO in step S1208a), the processing proceeds to step S1209. In step S1208b, the camera microcomputer 111 performs the processing for setting the panel luminance (FIG. 8).

In step S1209, the camera microcomputer 111 determines whether the execution of the copying is selected by the user on the screen for confirming the execution of the copying with an operation on the operation switch group 208 or a touch operation. If the camera microcomputer 111 determines that the execution of the copying is selected (YES in step S1209), the processing proceeds to step S1211. If not (NO in step S1209), the processing proceeds to step S1210. In step S1210, the camera microcomputer 111 determines whether an operation for canceling the copying is performed by the user with an operation on the operation switch group 208 or a touch operation. If the camera microcomputer 111 determines that the operation for canceling the copying is performed (YES in step S1210), the processing proceeds to step S1235. If not (NO in step S1210), the processing proceeds to step S1209.

In step S1211, the camera microcomputer 111 displays a copying execution screen on the main body display 116. In step S1212, the camera microcomputer 111 performs copying processing. In the copying processing, the camera microcomputer 111 first reads in the data (the moving image file) of the moving image that is the editing target (a copying target) from any of the magnetic tape 115, the DVD 117, and the memory card 118. Then, the camera microcomputer 111 stores the same moving image as the read moving image into any of the magnetic tape 115, the DVD 117, and the memory card 118 as a different file. The same attribute information as the moving image that is the copying source is added to the moving image file generated from the copying processing (the attribute information is also copied). In the other words, if the moving image with the HP information added thereto is copied, the HP information is also added to the newly generated moving image file. Upon completion of the copying processing, the processing proceeds to step S1235.

In step S1213, the camera microcomputer 111 displays a format selection screen for selecting a format after the conversion on the main body display 116. The format refers to a resolution and a bit rate of the moving image data, and, for example, "1920×1080, 24 Mbps", "1920×1080, 17 Mbps", "1280×720, 4 Mbps", and the like are displayed as choices thereof. In step S1214, the camera microcomputer 111 determines whether any of the format choices is selected by the user with an operation on the operation switch group 208 or a touch operation. If the camera microcomputer 111 determines that the format is selected (YES in step S1214), the processing proceeds to step 31216. If not (NO in step S1214), the processing proceeds to step S1215. In step S1215, the camera microcomputer 111 determines whether an operation for issuing an instruction to cancel the transcoding is performed by the user with an operation on the operation switch group 208 or a touch operation (whether a cancel button is pressed). If the camera microcomputer 111 determines that the operation for issuing the instruction to cancel the transcoding is performed (YES in step S1215), the processing proceeds to step S1235. If not (NO in step S1215), the processing proceeds to step S1214.

Figure 13B:
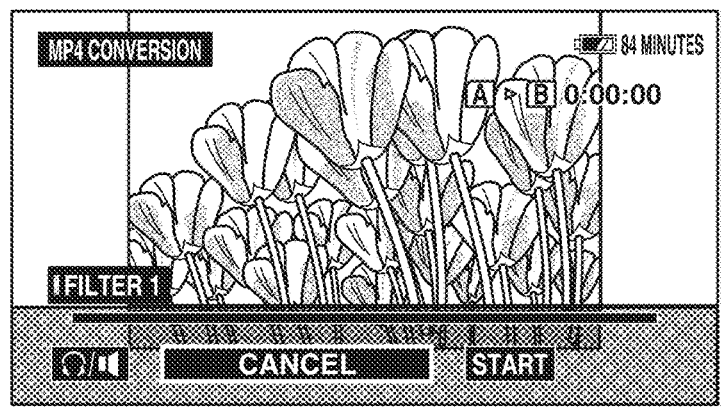

In step S1216, the camera microcomputer 111 displays a screen for confirming the execution of the transcoding (an editing screen for the transcoding) on the main body display 116. FIG. 13B illustrates a display example of the screen for confirming the execution of the transcoding. Choices for selecting whether to execute (START) or cancel the transcoding are displayed on the screen for confirming the execution of the transcoding together with the stopped video image of the moving image that is the editing target. The processing for setting the panel luminance (FIG. 8) is not performed when this screen is displayed, whereby the moving image that is the editing target is displayed with the user setting luminance regardless of whether this moving image is the HP moving image. This is because the HP information is not passed over (the HP information is not added) to the converted moving image generated by executing the transcoding, even when the moving image that is the editing target is the HP moving image. In other words, the HP information is not added to the moving image after the conversion even when the moving image before the conversion is the HP moving image, so that the moving image after the conversion is displayed with the user setting luminance even when the view assist function is on. Therefore, the camera microcomputer 111 displays the moving image on the screen for confirming the execution of the transcoding with the user setting luminance even when the moving image that is the editing target is the HP moving image and the view assist function is on, so as to allow the user to confirm in advance how the moving image after the conversion will be displayed.

In step S1217, the camera microcomputer 111 determines whether an operation for issuing an instruction to execute the transcoding is performed by the user with an operation on the operation switch group 208 or a touch operation. If the camera microcomputer 111 determines that the instruction to execute the transcoding is issued (YES in step S1217), the processing proceeds to step S1219. If not (NO in step S1217), the processing proceeds to step S1218. In step S1218, the camera microcomputer 111 determines whether an operation for issuing an instruction to cancel the transcoding is performed (whether a cancel button is pressed), similarly to step S1215. If the camera microcomputer 111 determines that the operation for issuing the instruction to cancel the transcoding is performed (YES in step S1218), the processing proceeds to step S1235. If not (NO in step S1218), the processing proceeds to step S1217.

In step S1219, the camera microcomputer 111 reads in the moving image that is the editing target from any of the magnetic tape 115, the DVD 117, and the memory card 118, and decodes the read moving image. Then, the camera microcomputer 111 starts reproducing the read moving image on a transcoding execution screen. In step S1220, the camera microcomputer 111 reads out the format information selected in step S1214 from the RAM 111b, and performs processing for transcoding the moving image that is the editing target according to the read format information. In the transcoding processing, it is also possible to combine a plurality of moving images. Therefore, inconsistency occurs in the attribute information if the HP moving image and the normal moving image are combined with each other, so that the HP information of the moving image processed as the conversion source is not passed over and discarded in the transcoding processing.

Figure 13C:
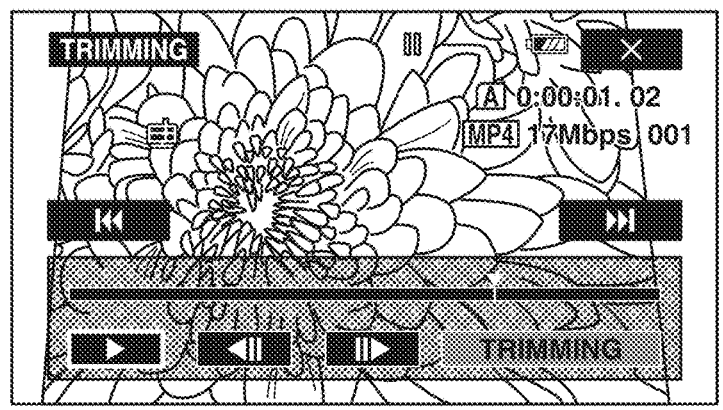

In step S1221, the camera microcomputer 111 displays a trimming execution screen on the main body display 116. FIG. 13C illustrates a display example of the trimming execution screen (an editing screen and a confirmation screen). On the trimming execution screen, the moving image that is the editing target is displayed in the stopped state, and display items for various kinds of operations for specifying a trimming position are also displayed. This trimming execution screen is not displayed with the user setting luminance but displayed with the luminance for the HP moving image if the moving image is the HP moving image and the view assist function is on, by processes of next steps, steps S1222 and S1223. In step S1222, the camera microcomputer 111 analyzes the attribute information of the displayed moving image, and determines whether the HP information is added thereto. If the camera microcomputer 111 determines that the HP information is added (YES in step S1222), the processing proceeds to step S1223. If not (NO in step S1222), the processing proceeds to step S1224. In step S1223, the camera microcomputer 111 performs the processing for setting the panel luminance (FIG. 8).

In step S1224, the camera microcomputer 111 determines whether an operation for changing the trimming position is performed by the user with an operation on the operation switch group 208 or a touch operation. If the camera microcomputer 111 determines that the operation for changing the trimming position is performed (YES in step S1224), the processing proceeds to step S1225. If not (NO in step S1224), the processing proceeds to step S1226. In step S1225, the camera microcomputer 111 updates trimming position information managed in the RAM 111b with use of information indicating the position selected by the user in step S1224.

In step S1226, the camera microcomputer 111 determines whether the execution of the trimming is selected by the user with an operation on the operation switch group 208 or a touch operation. If the camera microcomputer 111 determines that the execution of the trimming is selected (YES in step S1226), the processing proceeds to step S1228. If not (NO in step S1228), the processing proceeds to step S1227. In step S1227, the camera microcomputer 111 determines whether cancel of the trimming is selected by the user with an operation on the operation switch group 208 or a touch operation. If the camera microcomputer 111 determines that the cancel of the trimming is selected (YES in step S1227), the processing proceeds to step S1235. If not (NO in step S1227), the processing proceeds to step S1224.

In step S1228, the camera microcomputer 111 reads out the trimming position information from the RAM 111b, and divides the moving image specified as the editing target that is read out from any of the magnetic tape 115, the DVD 117, and the memory card 118 based on the trimming position information. Then, the camera microcomputer 111 stores a moving image generated by diving the editing target into any of the magnetic tape 115, the DVD 117, and the memory card 118 as a moving image file. Attribute information of the moving image file generated from the trimming processing is controlled so as to become the same as the attribute information of the moving image processed as the editing source. In other words, if the moving image with the HP information added thereto is trimmed, the same HP information is also added to the generated moving image.

In step S1229, the camera microcomputer 111 displays a screen for confirming the deletion of the moving image that is the editing target on the main body display 116. A button icon for issuing an instruction to execute the deletion, a button icon for issuing an instruction to cancel the deletion, and the stopped video image of the moving image that is the editing target are displayed on the screen for confirming the deletion. Processes of steps S1230 and S1231 are similar to the processes of steps S1222 and S1223.

In step S1232, the camera microcomputer 111 determines whether the button icon for issuing the instruction to execute the deletion is selected by the user with an operation on the operation switch group 208 or a touch operation. If the execution of the deletion is selected (YES in step S1232), the processing proceeds to step S1234. If not (NO in step S1232), the processing proceeds to step S1233. In step S1233, the camera microcomputer 111 determines whether the button icon for stopping (canceling) the deletion is selected by the user with an operation on the operation switch group 208 or a touch operation. If the cancel of the deletion is selected (YES in step S1233), the processing proceeds to step S1235. If not (NO in step S1233), the processing proceeds to step S1232.

In step S1234, the camera microcomputer 111 deletes the moving image (the moving image file) specified as the editing target that is stored in any of the magnetic tape 115, the DVD 117, and the memory card 118. Upon completion of the deletion, the processing proceeds to step S1235.

In step S1235, the camera microcomputer 111 reads out the user setting luminance recorded in the RAM 111b or the ROM 111a, and changes the luminance of the main body display 116 according to the read user setting luminance. In step S1236, the camera microcomputer 111 displays the screen data of the screen where the editing choices are listed on the main body display 116 again. After that, the processing returns to step S1203, followed by a repetition of the above-described processing.

In the present exemplary embodiments, the above-described various kinds of control are performed by the camera microcomputer 111. Alternatively, a single hardware device may perform them, or a plurality of hardware devices may realize the control of the entire apparatus by dividing the processing among them.

Further, having described the present invention in detail based on the representative exemplary embodiment thereof, the aspect of the embodiments is not limited to this specific exemplary embodiment, and also covers various embodiments within a range that does not depart from the spirit of the aspect of the embodiments. Further, the above-described exemplary embodiment merely indicates one exemplary embodiment of the present invention, and the exemplary embodiment can also be arbitrarily combined with another embodiment.

Further, in the above-described exemplary embodiment, the present invention has been described based on the example that the present invention is applied to the imaging apparatus 100, but this is not limited to this example. The aspect of the embodiments can be applied to any display control apparatus that can display an image captured with use of a gamma curve exhibiting a lower tone in the low-luminance to intermediate-luminance region compared to the normal gamma curve, like a gamma curve at the time of the imaging that is employed in the high-luminance priority mode (the HP mode) in the above-described exemplary embodiment. In other words, the aspect of the embodiments relates to the control at the time of the display, and may be unequipped with a configuration regarding the imaging. Therefore, the aspect of the embodiments can be applied to a digital camera, a personal computer, a personal digital assistant (PDA), a mobile telephone terminal and a mobile image viewer, a digital photo frame, a music player, a game machine, an electronic book reader, and the like. Needless to say, the digital camera includes a digital single-lens reflex camera, a digital still camera, and a digital video camera.

According to the above-described exemplary embodiment, it is possible to improve the visibility of the intermediate-luminance portion and the low-luminance portion when display is performed for the video image having the gradation characteristic closer to the linearity with respect to the luminance than the conventional characteristic on the display apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'nontransitory computer-readable storage medium') to perform the functions of one or more of the above-described embodiment(s) and/or that includes one or more circuits (e.g., application specific integrated circuit (ASIC)) for performing the functions of one or more of the above described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the aspect of the embodiments has been described with reference to exemplary embodiments, it is to be understood that the aspect of the embodiments not limited to the disclosed exemplary embodiments. The scope of the following claims is to be accorded the broadest interpretation so as to encompass all such modifications and equivalent structures and functions.

This application claims the benefit of Japanese Patent Application No. 2015-220703, filed Nov. 10, 2015, No. 2015-220756, filed Nov. 10, 2015, and No. 2015-220757, filed Nov. 10, 2015, which are hereby incorporated by reference herein in their entirety.

What is claimed is:

1. An apparatus comprising:
a memory and at least one processor and/or at least one circuit to perform the operations of the following units:
a display control unit configured to display a first type of image generated with a first gradation characteristic, and a second type of image generated with a second gradation characteristic having a higher gradation quality on a high-luminance side than the first gradation characteristic; and
a control unit configured to perform control such that luminance of a display unit is set to second luminance higher than first luminance of a case where the first type of image is displayed on the display unit, in a case where the second type of image is displayed on the display unit,
wherein in a case where a luminance setting of the display unit is a luminance setting as bright as or brighter than a predetermined value, the control unit performs control such that an output gamma characteristic with which the second type of image is output on the display unit is set to a second output gamma characteristic that enables a low-luminance side to be displayed more brightly than a first output gamma characteristic with which the first type of image is output on the display unit.

2. The apparatus according to claim 1, wherein the predetermined value is the second luminance.

3. The apparatus according to claim 1, wherein the luminance setting is a luminance setting set by a user.

4. The apparatus according to claim 1, further comprising:
an imaging unit; and
a mode setting unit configured to set a mode to any of a plurality of modes using gradation characteristics different from one another at the time of imaging by the imaging unit, the plurality of modes including at least a first mode using the first gradation characteristic and a second mode using the second gradation characteristic,
wherein in a case where a live view image being captured in the second mode is displayed, the control unit performs control such that the luminance of the display unit is set to brighter luminance than luminance of a case where a live view image being captured in the first mode is displayed.

5. The apparatus according to claim 1, further comprising a processing unit configured to perform any editing processing from among a plurality of kinds of editing processing on an image,
wherein on an editing screen or a confirmation screen for performing first editing processing on the second type of image, the control unit performs control such that the second type of image is displayed with the first luminance without the display unit set to the second luminance, and
wherein on an editing screen or a confirmation screen for performing second editing processing on the second type of image, the control unit performs control such that the second type of image is displayed with the display unit set to the second luminance.

6. The apparatus according to claim 5, wherein the first editing processing is such editing processing that, even in a case where specific attribute information indicating that the image is the second type of image is added to the image before the editing, the specific attribute information is not added to the image after the editing.

7. The apparatus according to claim 5, wherein the first editing processing is at least one of transcoding and editing for combining a plurality of images.

8. The apparatus according to claim 5, wherein in a case where specific attribute information indicating that the image is the second type of image is added to the image before the editing, the second editing processing is such editing processing that the specific attribute information is also added to the image after the editing.

9. The apparatus according to claim 5, wherein the second editing processing is at least one of trimming and copying.

10. A non-transitory computer-readable storage medium storing a program for causing a computer to function as each of the units of the apparatus according to claim 1.

11. An apparatus comprising:
a memory and at least one processor and/or at least one circuit to perform the operations of the following units:
a display control unit configured to display a first type of image generated with a first gradation characteristic, and a second type of image generated with a second gradation characteristic having a higher gradation quality on a high-luminance side than the first gradation characteristic;
a control unit configured to perform control such that luminance of a display unit is set to second luminance higher than first luminance of a case where the first type of image is displayed on the display unit, in a case where the second type of image is displayed on the display unit; and
a setting unit configured to set whether to turn on an assist function for visibility of when the second type of image is displayed,
wherein in a case where the assist function is not turned on, the control unit performs control such that the luminance of the display unit is not changed from the first luminance even when the second type of image is displayed.

12. The apparatus according to claim 11, wherein in a case where a luminance setting of the display unit is a luminance setting as bright as or brighter than a predetermined value, the control unit performs control such that an output gamma characteristic with which the second type of image is output on the display unit is set to a second output gamma characteristic that enables a low-luminance side to be displayed more brightly than a first output gamma characteristic with which the first type of image is output on the display unit.

13. An apparatus comprising:
a memory and at least one processor and/or at least one circuit to perform the operations of the following units:
a display control unit configured to display a first type of image generated with a first gradation characteristic, and a second type of image generated with a second gradation characteristic having a higher gradation quality on a high-luminance side than the first gradation characteristic; and
a control unit configured to perform control such that luminance of a display unit is set to second luminance higher than first luminance of a case where the first type of image is displayed on the display unit, in a case where the second type of image is displayed on the display unit,
wherein when an image display is performed in a multi-screen form in which a plurality of images is displayed on a single screen, the control unit performs control such that even in a case where the second type of image is included in the plurality of images, the luminance of the display unit is not changed from the first luminance.

14. The apparatus according to claim 13, wherein the control unit performs control such that the luminance of the display unit is set to the first luminance in response to a screen switching from a state in which the second type of image is displayed with the luminance of the display unit set to the second luminance to a state in which a video image that is not an image captured by an image sensor is displayed.

15. The apparatus according to claim 13,
wherein the memory and at least one processor and/or at least one circuit to perform the operations of an acquisition unit configured to acquire a recorded image and attribute information of the image,
wherein based on the acquired attribute information, the control unit performs control such that the luminance of the display unit is set to the second luminance when the image to which the attribute information indicating that the image is the second type of image is added is reproduced.

16. The apparatus according to claim 15, wherein based on the acquired attribute information, the control unit performs control such that when the image to which the attribute information indicating that the image is the second type of image is added is reproduced, a display item indicating that the image is the second type of image is displayed together with the image.

17. The apparatus according to claim 13, wherein in a case where the second type of image is displayed with the luminance changed from the first luminance to the second luminance, the control unit performs control such that a display item to be displayed together with the second type of image is drawn with lower brightness.

18. The apparatus according to claim 13, wherein each of the first gradation characteristic and the second gradation characteristic is a gradation characteristic when luminance of an object is converted into a gradation value, and the second gradation characteristic is a gradation characteristic that exhibits a lower gradation quality on an intermediate-luminance to low-luminance side of the object and has a larger number of gradation values allocated to the high-luminance side than the first gradation characteristic.

19. The apparatus according to claim 13,
wherein the first type of image is captured with a first gradation characteristic, and the second type of image is captured with the second gradation characteristic.

20. An apparatus comprising:
a memory and at least one processor and/or at least one circuit to perform the operations of the following units:
a display control unit configured to display a first type of image generated with a first gradation characteristic, and a second type of image generated with a second gradation characteristic having a higher gradation quality on a high-luminance side than the first gradation characteristic; and
a control unit configured to perform control such that luminance of a display unit is set to second luminance higher than first luminance of a case where the first type of image is displayed on the display unit, in a case where the second type of image is displayed on the display unit,
wherein the control unit performs control such that the luminance of the display unit is set to the first luminance in response to the screen switching from a state in which the second type of image is displayed with the luminance of the display unit set to the second luminance to a menu screen where a setting of the display unit is set.

21. The apparatus according to claim 20, wherein when a setting screen, which is provided under a hierarchical level of the menu screen, to be displayed together with the second type of image is displayed, the control unit performs control such that the luminance of the display unit is changed from the first luminance to the second luminance.

22. An apparatus comprising:
a memory and at least one processor and/or at least one circuit to perform the operations of the following units:
a display control unit configured to display a first type of image generated with a first gradation characteristic, and a second type of image generated with a second gradation characteristic having a higher gradation quality on a high-luminance side than the first gradation characteristic;
a control unit configured to perform control such that luminance of a display unit is set to second luminance higher than first luminance of a case where the first type of image is displayed on the display unit, in a case where the second type of image is displayed on the display unit; and
an output unit configured to output an image to an external display apparatus,
wherein when the second type of image is output from the output unit, the control unit performs control such that a guide prompting a user to change luminance of the external display apparatus is output from the output unit together with the second type of image.

23. The display control apparatus according to claim 22, further comprising a detector configured to detect whether the external display apparatus is connected to the output unit,
wherein in a case where the external display apparatus is connected to the output unit, the control unit performs control such that the guide prompting the user to change the luminance of the external display apparatus is output from the output unit together with the second type of image.

24. A method for controlling an apparatus, the method comprising:
performing display control of displaying a first type of image generated with a first gradation characteristic and a second type of image generated with a second gradation characteristic having a higher gradation quality on a high-luminance side than the first gradation characteristic; and
performing control such that luminance of a display unit is set to second luminance higher than first luminance of a case where the first type of image is displayed, in a case where the second type of image is displayed,
wherein in a case where a luminance setting of the display unit is a luminance setting as bright as or brighter than a predetermined value, the performing control such that an output gamma characteristic with which the second type of image is output on the display unit is set to a second output gamma characteristic that enables a low-luminance side to be displayed more brightly than a first output gamma characteristic with which the first type of image is output on the display unit.

25. A method comprising:
displaying a first type of image generated with a first gradation characteristic, and a second type of image generated with a second gradation characteristic having a higher gradation quality on a high-luminance side than the first gradation characteristic;
performing control such that luminance of a display unit is set to second luminance higher than first luminance of a case where the first type of image is displayed on the display unit, in a case where the second type of image is displayed on the display unit; and
setting whether to turn on an assist function for visibility of when the second type of image is displayed,
wherein in a case where the assist function is not turned on, the performing control performs control such that the luminance of the display unit is not changed from the first luminance even when the second type of image is displayed.

26. A method comprising:
displaying a first type of image generated with a first gradation characteristic, and a second type of image generated with a second gradation characteristic having a higher gradation quality on a high-luminance side than the first gradation characteristic; and
performing control such that luminance of a display unit is set to second luminance higher than first luminance of a case where the first type of image is displayed on the display unit, in a case where the second type of image is displayed on the display unit, wherein when an image display is performed in a multi-screen form in which a plurality of images is displayed on a single screen, the performing control performs control such that even in a case where the second type of image is included in the plurality of images, the luminance of the display unit is not changed from the first luminance.

27. A method comprising:

displaying a first type of image generated with a first gradation characteristic, and a second type of image generated with a second gradation characteristic having a higher gradation quality on a high-luminance side than the first gradation characteristic; and performing control such that luminance of a display unit is set to second luminance higher than first luminance of a case where the first type of image is displayed on the display unit, in a case where the second type of image is displayed on the display unit, wherein the performing control performs control such that the luminance of the display unit is set to the first luminance in response to the screen switching from a state in which the second type of image is displayed with the luminance of the display unit set to the second luminance to a menu screen where a setting of the display unit is set.

28. A method comprising:

displaying a first type of image generated with a first gradation characteristic, and a second type of image generated with a second gradation characteristic having a higher gradation quality on a high-luminance side than the first gradation characteristic;

performing control such that luminance of a display unit is set to second luminance higher than first luminance of a case where the first type of image is displayed on the display unit, in a case where the second type of image is displayed on the display unit; and outputting an image to an external display apparatus, wherein when the second type of image is output from the outputting, the performing control performs control such that a guide prompting a user to change luminance of the external display apparatus is output from the output unit together with the second type of image.

29. A non-transitory computer-readable storage medium storing a program of instructions for causing a computer to perform a method comprising:

displaying a first type of image generated with a first gradation characteristic, and a second type of image generated with a second gradation characteristic having a higher gradation quality on a high-luminance side than the first gradation characteristic;

performing control such that luminance of a display unit is set to second luminance higher than first luminance of a case where the first type of image is displayed on the display unit, in a case where the second type of image is displayed on the display unit; and setting whether to turn on an assist function for visibility of when the second type of image is displayed, wherein in a case where the assist function is not turned on, the performing control performs control such that the luminance of the display unit is not changed from the first luminance even when the second type of image is displayed.

30. A non-transitory computer-readable storage medium storing a program of instructions for causing a computer to perform a method comprising:

displaying a first type of image generated with a first gradation characteristic, and a second type of image generated with a second gradation characteristic having a higher gradation quality on a high-luminance side than the first gradation characteristic; and performing control such that luminance of a display unit is set to second luminance higher than first luminance of a case where the first type of image is displayed on the display unit, in a case where the second type of image is displayed on the display unit, wherein when an image display is performed in a multi-screen form in which a plurality of images is displayed on a single screen, the performing control performs control such that even in a case where the second type of image is included in the plurality of images, the luminance of the display unit is not changed from the first luminance.

31. A non-transitory computer-readable storage medium storing a program of instructions for causing a computer to perform a method comprising:

displaying a first type of image generated with a first gradation characteristic, and a second type of image generated with a second gradation characteristic having a higher gradation quality on a high-luminance side than the first gradation characteristic; and performing control such that luminance of a display unit is set to second luminance higher than first luminance of a case where the first type of image is displayed on the display unit, in a case where the second type of image is displayed on the display unit, wherein the performing control performs control such that the luminance of the display unit is set to the first luminance in response to the screen switching from a state in which the second type of image is displayed with the luminance of the display unit set to the second luminance to a menu screen where a setting of the display unit is set.

32. A non-transitory computer-readable storage medium storing a program of instructions for causing a computer to perform a method comprising:

displaying a first type of image generated with a first gradation characteristic, and a second type of image generated with a second gradation characteristic having a higher gradation quality on a high-luminance side than the first gradation characteristic;

performing control such that luminance of a display unit is set to second luminance higher than first luminance of a case where the first type of image is displayed on the display unit, in a case where the second type of image is displayed on the display unit; and outputting an image to an external display apparatus, wherein when the second type of image is output from the outputting, the performing control performs control such that a guide prompting a user to change luminance of the external display apparatus is output from the output unit together with the second type of image.

* * * * *